United States Patent
Paz et al.

(10) Patent No.: US 12,556,205 B2
(45) Date of Patent: Feb. 17, 2026

(54) REPEATER

(71) Applicant: QUALCOMM Incorporated, San Diego, CA (US)

(72) Inventors: Daniel Paz, Atlit (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/183,750

(22) Filed: Mar. 14, 2023

(65) Prior Publication Data

US 2024/0313809 A1   Sep. 19, 2024

(51) Int. Cl.
*H04B 1/00* (2006.01)
*H04B 1/04* (2006.01)
*H04B 7/0426* (2017.01)
*H04B 7/155* (2006.01)

(52) U.S. Cl.
CPC ............ *H04B 1/006* (2013.01); *H04B 1/0483* (2013.01); *H04B 7/043* (2013.01); *H04B 7/15507* (2013.01)

(58) Field of Classification Search
CPC ...................................................... H04B 1/006
See application file for complete search history.

(56) References Cited

U.S. PATENT DOCUMENTS 3,879,581 A * 4/1975 Schlosser ............. H04B 7/2125
370/324
2002/0137458 A1* 9/2002 Talwalkar .............. H04B 7/155
455/11.1
2004/0131125 A1* 7/2004 Sanderford, Jr. ... H04L 25/4902
375/261

* cited by examiner

Primary Examiner — Hsinchun Liao
(74) Attorney, Agent, or Firm — Harrity & Harrity LLP

(57) ABSTRACT

Various aspects of the present disclosure generally relate to wireless communication. In some aspects, a repeater may receive control information via a user equipment (UE) entity of the repeater, the control information associated with operation of a wideband entity and a narrowband entity of the repeater. The repeater may receive synchronization information via the narrowband entity, the synchronization information associated with synchronization of wideband communications of the wideband entity. The repeater may receive and forwarding the wideband communications via the wideband entity and based at least in part on the control information and the synchronization information. Numerous other aspects are described.

30 Claims, 10 Drawing Sheets

REPEATER

FIELD OF THE DISCLOSURE

Aspects of the present disclosure generally relate to wireless communication and to techniques and apparatuses for a repeater.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
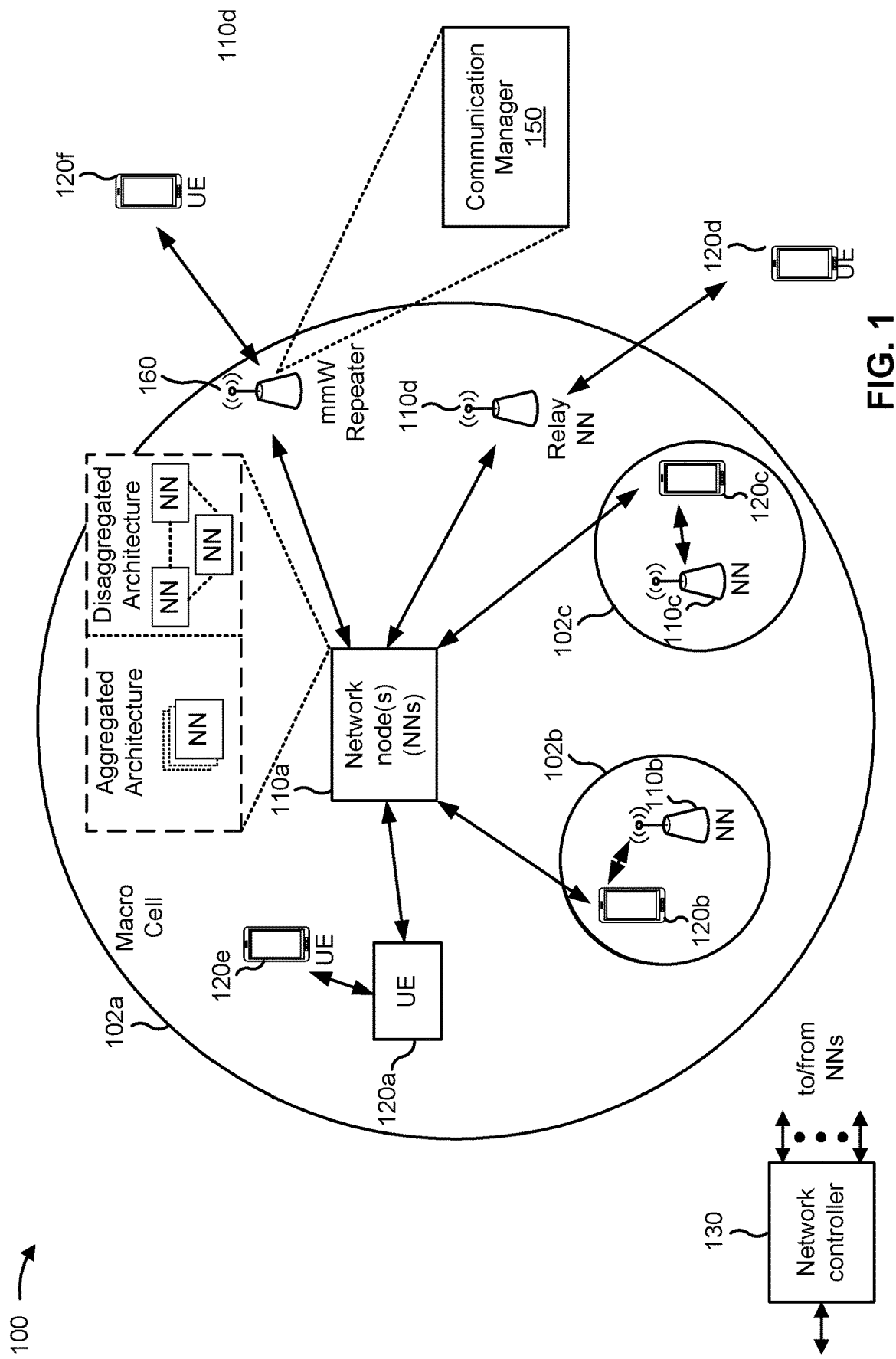
FIG. 1 is a diagram illustrating an example of a wireless network, in accordance with the present disclosure.

Some aspects described herein relate to a method of wireless communication performed by a repeater. The method may include receiving control information via a user equipment (UE) entity of the repeater, the control information associated with operation of a wideband entity and a narrowband entity of the repeater. The method may include receiving synchronization information via the narrowband entity, the synchronization information associated with synchronization of wideband communications of the wideband entity. The method may include receiving a wideband communication via the wideband entity. The method may include forwarding the wideband communication via the wideband entity based at least in part on the control information and the synchronization information.

Some aspects described herein relate to a repeater for wireless communication. The repeater may include a memory and one or more processors coupled to the memory. The one or more processors may be configured to receive control information via a UE entity of the repeater, the control information associated with operation of a wideband entity and a narrowband entity of the repeater. The one or more processors may be configured to receive synchronization information via the narrowband entity, the synchronization information associated with synchronization of wideband communications of the wideband entity. The one or more processors may be configured to receive a wideband communication via the wideband entity. The one or more processors may be configured to forward the wideband communication via the wideband entity and based at least in part on the control information and the synchronization information.

Some aspects described herein relate to a non-transitory computer-readable medium that stores a set of instructions for wireless communication by a repeater. The set of instructions, when executed by one or more processors of the repeater, may cause the repeater to receive control information via a UE entity of the repeater, the control information associated with operation of a wideband entity and a narrowband entity of the repeater. The set of instructions, when executed by one or more processors of the repeater, may cause the repeater to receive synchronization information via the narrowband entity, the synchronization information associated with synchronization of wideband communications of the wideband entity. The set of instructions, when executed by one or more processors of the repeater, may cause the repeater to receive a wideband communication via the wideband entity. The set of instructions, when executed by one or more processors of the repeater, may cause the repeater to forward the wideband communication via the wideband entity and based at least in part on the control information and the synchronization information.

Some aspects described herein relate to an apparatus for wireless communication. The apparatus may include means for receiving control information via a UE entity of the repeater, the control information associated with operation of a wideband entity and a narrowband entity of the repeater. The apparatus may include means for receiving synchronization information via the narrowband entity, the synchronization information associated with synchronization of wideband communications of the wideband entity. The apparatus may include means for receiving a wideband communication via the wideband entity. The apparatus may include means for forwarding the wideband communication via the wideband entity and based at least in part on the control information and the synchronization information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

In some networks using high frequency signaling, such as a sub Terahertz (SubThz) band, signals may have a relatively high propagation loss and a relatively small coverage area when compared with networks using lower frequency signaling. To compensate for the relatively high propagation loss and relatively small coverage area, the network may deploy repeaters to extend coverage of the network. For example, a network node may transmit a communication to a UE that is out of range of the network node. The repeater may receive the communication and then forward the communication (e.g., after amplifying the communication) to the UE, similarly, the repeater may receive an uplink communication from the UE and then forward the communication to the network node.

In some networks, the repeater may establish a first link with the network node via a primary cell (PCell) and may establish a second link with the network node via a secondary cell (SCell). The PCell may be used to exchange information between the network node and the repeater, and the SCell may be used to communicate between the network node and the UE via the network node. The SCell may operate using high frequency signaling and the PCell may operate using a relatively low frequency signaling. In this way, the PCell may have greater coverage than the SCell and/or may provide communications with relatively low error rates, which the SCell may support a higher throughput for communications between the network node and the UE.

In some networks, an SCell may have a minimum scope of critical functionality (e.g., relying on a PCell and/or lower frequency band cell for some functionality). For example, a network node may not transmit an "always on" signal, such as a synchronization signal block (SSB) or other reference signal (RS) that a UE can use to synchronize with the network node over the SCell. In some networks, the SCell may be active for sporadic and/or short time sessions with a burst activity pattern.

In some networks, the SCell (e.g., a subTHz-based SCell) may operate using one or more hops between the UE and the network node. For example, the one or more hops may traverse one or more power-efficient, smart repeaters (repeaters (RPs) and/or access points (APs), among other examples) with out-of-band control using the PCell.

Smart repeaters (e.g., for subTHz) may have functional parts, such as a RedCap UE entity for PCell connectivity (e.g., to deliver out-of-band control messages, reports, and/or feedbacks, among other examples), wideband analog amplify & forward (AF) functionality for data forwarding, a dedicated narrowband local SSB and/or synchronization RS transmission and/or reception capability over the SCell (e.g., using subTHz carrier frequencies) for complementary time synchronization and beam refinement processing. A communication link between the UE and the network node may have progressive synchronization across hops, hop-specific synchronization, and beam management sessions with customized synchronization RSs and/or SSB mini-burst scheduling.

When an SCell or a PCell operate at different FRs and/or with different RATs. or otherwise operate with different latency between a UE and a network node, synchronization with the PCell may not be sufficient for synchronization with the SCell. Based at least in part on the SCell link not being continuously active with "always on" signals or other synchronization signals when not actively communicating via the SCell, the UE and/or any smart repeaters along the communication link may need to synchronize before beginning communication to avoid communication errors that may have otherwise been caused by timing errors. However, performing a full synchronization procedure and/or a beam management procedure may consume an amount of time that causes data to fail a latency requirement. Additionally, or alternatively, performing a full synchronization procedure may consume power resources unnecessarily. In this way, activating the SCell may provide an increased throughput capacity, but may cause communication errors while the UE synchronizes with the network node via the SCell.

In some aspects described herein, the UE and/or a repeater (e.g., a smart repeater, an AP, and/or an RP, among other examples) may perform synchronization (e.g., time and/or frequency synchronization) with the network node for the SCell, with the synchronization based at least in part on a PCell synchronization. For example, a wireless communication device (e.g., the UE and/or the repeater) may obtain synchronization with the PCell of a wireless network (e.g., using RSs of the PCell). The wireless communication device may receive an indication to activate an SCell of the wireless network and may receive an RS of the SCell. The wireless communication device may obtain synchronization with the SCell based at least in part on an offset between the RS of the SCell and a reference time of the PCell. The reference time may be based at least in part on the synchronization with the PCell. Once synchronized with the SCell, the wireless communication device may communicate via the SCell. By obtaining synchronization with the SCell based at least in part on an offset between the RS of the SCell and a reference time of the PCell, the network may support acquisition of synchronization over the SCell (e.g., across all hops) in a reduced amount of time as compared to a full synchronization procedure. Additionally, or alternatively, the wireless communication device may conserve power resources that may have otherwise been consumed by performing a full synchronization procedure over the SCell.

The SCell time synchronization session (which may include also a beam management synchronization) may be scheduled and/or performed by the network node via the PCell. For example, SCell time synchronization session may be scheduled and/or performed by the network node per link activation (e.g., an indication to activate the SCell), per pre-defined time period and/or periodicity along a long-lasting active SCell-based data offloading session, and/or as an event driven synchronization session scheduled during an active data offloading session responsive to one or more events, among other examples.

In some aspects, a time synchronization session may be based at least in part on a synchronization session configuration for a reception side (and transmission side of intermediate hops) that is indicated and/or performed over a PCell link and with reference to PCell timing. In some aspects, the time synchronization session may use PCell timing information for coarse time synchronization and/or referencing to define time search boundaries and/or a time uncertainty for an SCell local synchronization session per SCell link activation. A wireless communication device (e.g., a downstream wireless communication device) may estimate fine timing (e.g., a delta timing offset) for the SCell with respect to a configured reception time for the SCell synchronization session based at least in part on a PCell timing, slot, and/or control signaling slot. In this way the wireless communication device may have no independent TTL on the SCell, and the SCell time synchronization is obtained based at least in part on the PCell coarse time and a locally estimated relative timing offset. In some aspects, an overall time synchronization per multi-hop link may be established using a progressive synchronization approach.

In some aspects, an SCell control message may be signaled over the PCell with reference to (e.g., as a timing reference for determining and/or application of the timing offset) a PCell downlink slot index, a PCell symbol within a downlink slot, a PCell downlink slot carrying the control message (e.g., physical downlink control channel (PDCCH)), a scheduling event on the PCell for either the PCell or the SCell (e.g., indicated relative to this scheduling and based on PCell timing), and/or an additional time offset relative to any of the previous references. In some aspects, the additional time offset may be indicated and/or configured for synchronization with the SCell.

In some aspects, a relative offset in SCell time units (e.g., symbols and/or slots) may be provided for an SCell control application for communications assumed to be scheduled via the SCell. For example, every PCell slot and/or symbol may include multiple SCell slots/symbols, so the SCell control information (e.g., scheduling DCI) may indicate a timing of subsequent SCell time units with reference to a PCell time unit. SCell control information may indicate scheduling of synchronization RSs and/or associated reception and/or transmission time, scheduling of SCell data and/or a forwarding operation, and/or scheduling of SCell link adaptation (LA) RS, among other examples.

Based at least in part on using the PCell synchronization for SCell synchronization, the network may support acquisition of synchronization over the SCell (e.g., across all hops) in a reduced amount of time and/or may conserve power resources that may have otherwise been used to perform full synchronization using only SCell signals.

Additionally, or alternatively, a progressive synchronization approach supports low latency and low power multi-hop link synchronization with smart repeaters having a PCell-based out-of-band control. For example, in a network with one or more repeaters between a UE and a network node, using the PCell-based (e.g., out-of-band for the SCell) timing to assist in synchronization of the SCell, each of the one or more repeaters may conserve power resources that may have otherwise been consumed by funny synchronizing using only SCell signaling.

Further, using the PCell synchronization for SCell synchronization may support faster SCell link activation and deactivation for eligible UEs with low complexity, low power, and low latency penalties to support a burst activity pattern for improved power efficiency. For example, the wireless communication device may obtain synchronization of the SCell more quickly than if using only SCell signaling. In this way, use of the SCell for intermittent, burst, and/or high throughput communications when needed to temporarily supplement the PCell may be optimized for efficiency in consumption of power resources.

In some aspects, using the PCell synchronization for SCell synchronization may extend a range of use cases and scenarios where SCells having relatively high FRs may be used with reasonable implementation and deployment implications (e.g., with relatively fast SCell link activation and reduced power consumption). Further, using the PCell synchronization for SCell synchronization may speed up initial high-FR (e.g., subTHz) deployments (e.g., with a strong reliance on lower frequency bands).

In some aspects described herein, the repeater may include a wideband entity configured to perform analog A&F for SubThz and/or SCell data forwarding, an narrowband entity (e.g., an narrowband digital unit) to perform SubThz and/or SCell local synchronization and beam management RF processing, and a REDCAP UE entity to support lower band and/or PCell connectivity for receiving out-of-band control information based at least in part on the PCell for the repeater.

Based at least in part on the repeater including the wideband entity, the narrowband entity, and the UE entity, the repeater may improve power efficiency, power consumption, and coverage in a high frequency network, such as a SubThz network. Additionally, or alternatively, the repeater may support out-of-band control over a PCell link for improved power consumption, which may allow an increased number of repeaters that can be supported under a coverage range of the Pcell coverage range (e.g., improving synchronization signal block (SSB) scalability and direct link or indirect link association ambiguity). Further, the repeater may support reduced latency for SubThz activation or deactivation for improved power efficiency, may support an extended range of use cases where SubThz can be applicable with reasonable implementation and deployment implications, and/or reduced time for initial SubThz deployments by using lower frequency bands. Additionally, or alternatively, the repeater may support multi-hop link synchronization procedures when a high number of repeaters is involved in multi-hop link establishment and/or fast "in sync" state acquisition over the SubThz and/or SCell (e.g., across all hops) via a sequence of back-to-back hop-specific synchronization sessions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a repeater node, a forwarding node, and/or a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FRI is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the repeater may include a communication manager 150. As described in more detail elsewhere herein, the communication manager 150 may receive control information via a UE entity of the repeater, the control information associated with operation of a wideband entity and a narrowband entity of the repeater; receive synchronization information via the narrowband entity, the synchronization information associated with synchronization of wideband communications of the wideband entity; receive a wideband communication via the wideband entity, and forward the wideband communications via the wideband entity and based at least in part on the control information and the synchronization information. Additionally, or alternatively, the communication manager 150 may perform one or more other operations described herein.

In some aspects, a millimeter wave (mmW) repeater 160 may receive a millimeter wave signal (e.g., an analog millimeter wave signal) from a network node 110, may amplify the millimeter wave signal, and may transmit the amplified millimeter wave signal to one or more UEs 120 (e.g., shown as UE 120f). In some aspects, the mmW repeater 160 may be an analog mmW repeater, sometimes also referred to as a layer 1 mmW repeater. Additionally, or alternatively, the mmW repeater 160 may be a wireless transmit receive point (TRP) acting as a distributed unit (e.g., of a 5G access node) that communicates wirelessly with a network node 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 160 may be reduced.

As indicated above, FIG. 1 is provided as an example. Other examples may differ from what is described with regard to FIG. 1.

Figure 2:
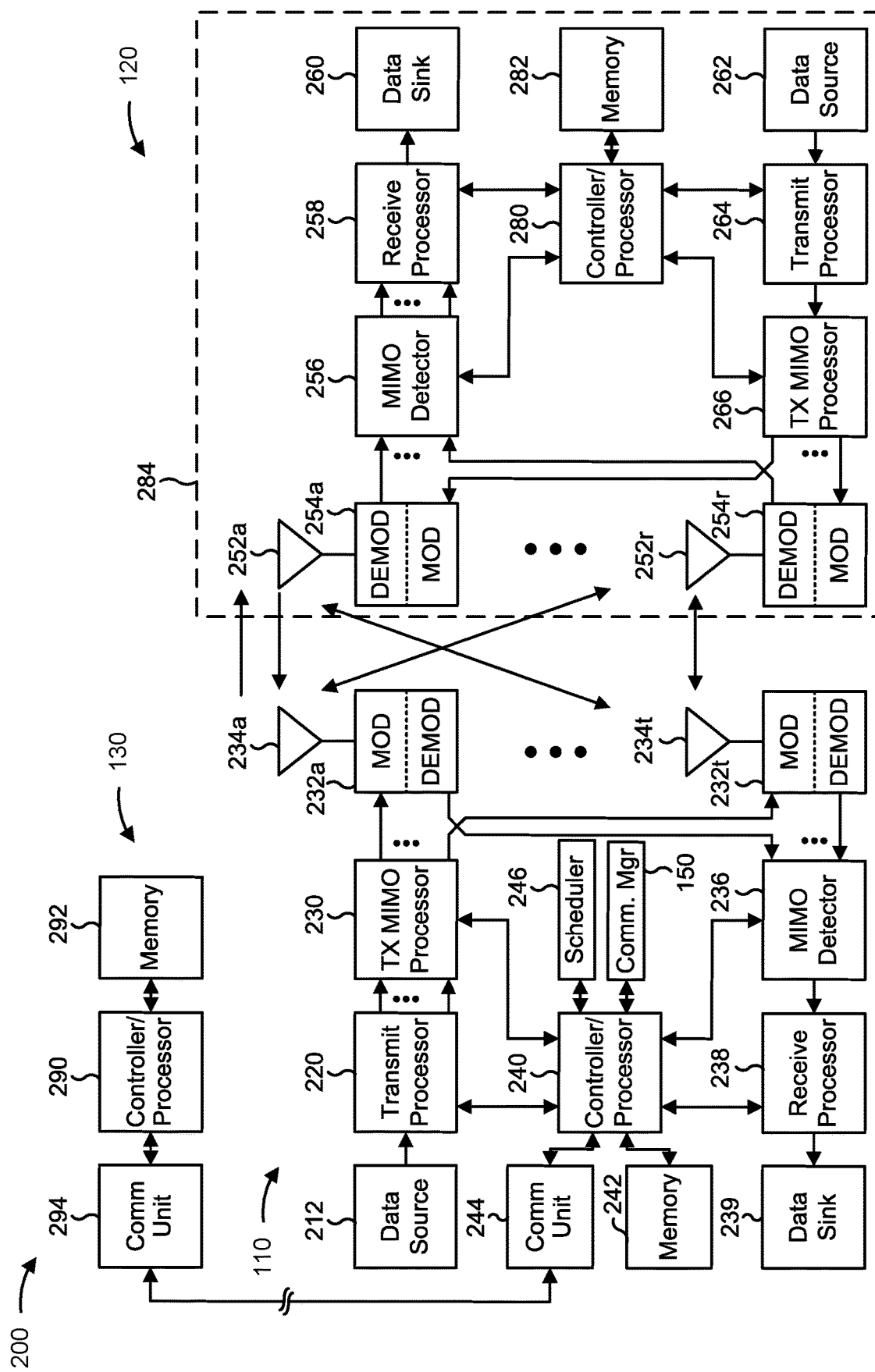
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the network node 110, the controller/processor 280 of the UE 120, and/or any other component(s) of FIG. 2 may perform one or more techniques associated with a repeater node, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a repeater (e.g., a network node that may include a UE entity) includes means for receiving control information via a UE entity of the repeater, the control information associated with operation of a wideband entity and a narrowband entity of the repeater; means for receiving synchronization information via the narrowband entity, the synchronization information associated with synchronization of wideband communications of the wideband entity; means for receiving the wideband communication via the wideband entity; and/or means for forwarding the wideband communications via the wideband entity and based at least in part on the control information and the synchronization information. In some aspects, the means for the repeater to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the repeater to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
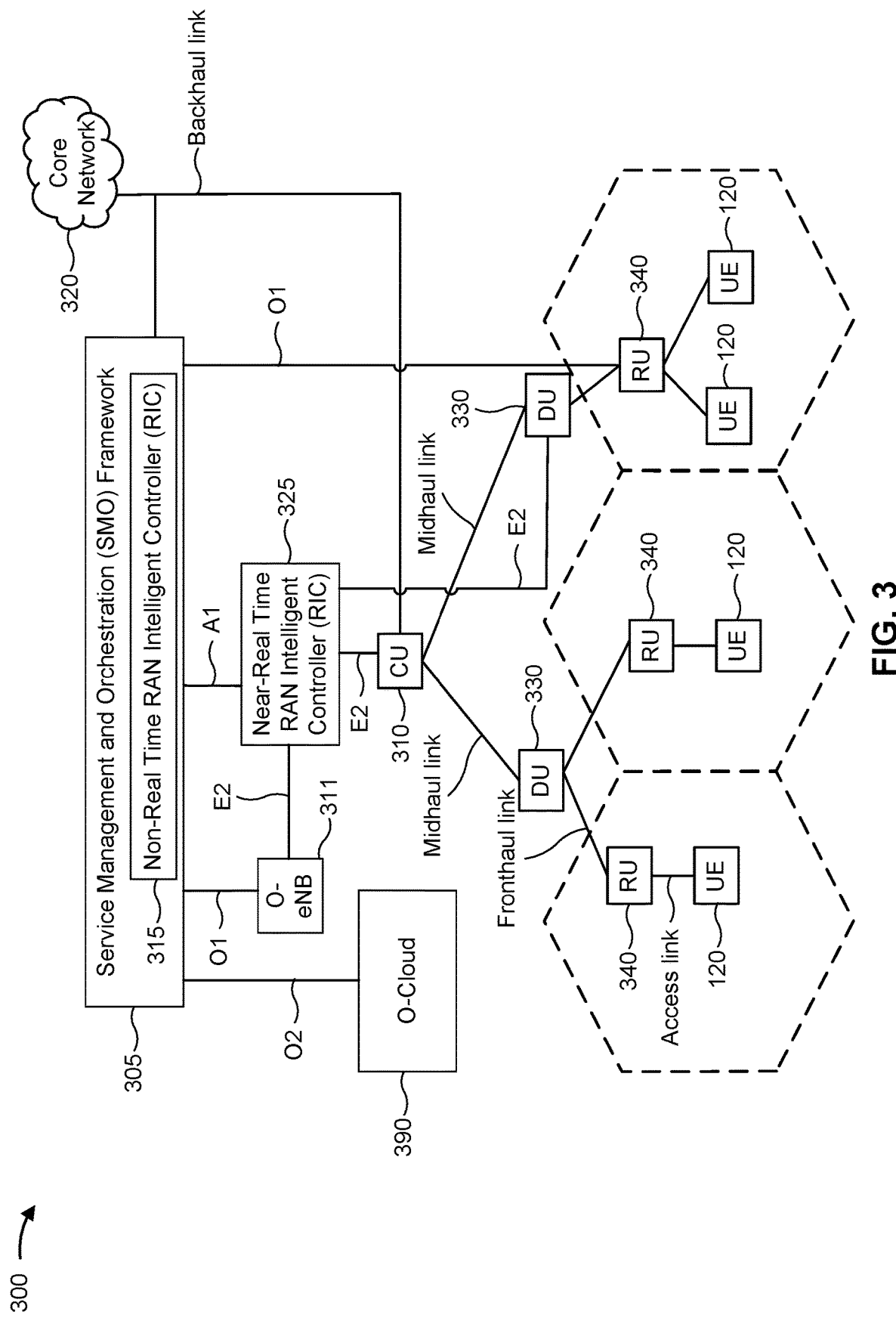
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
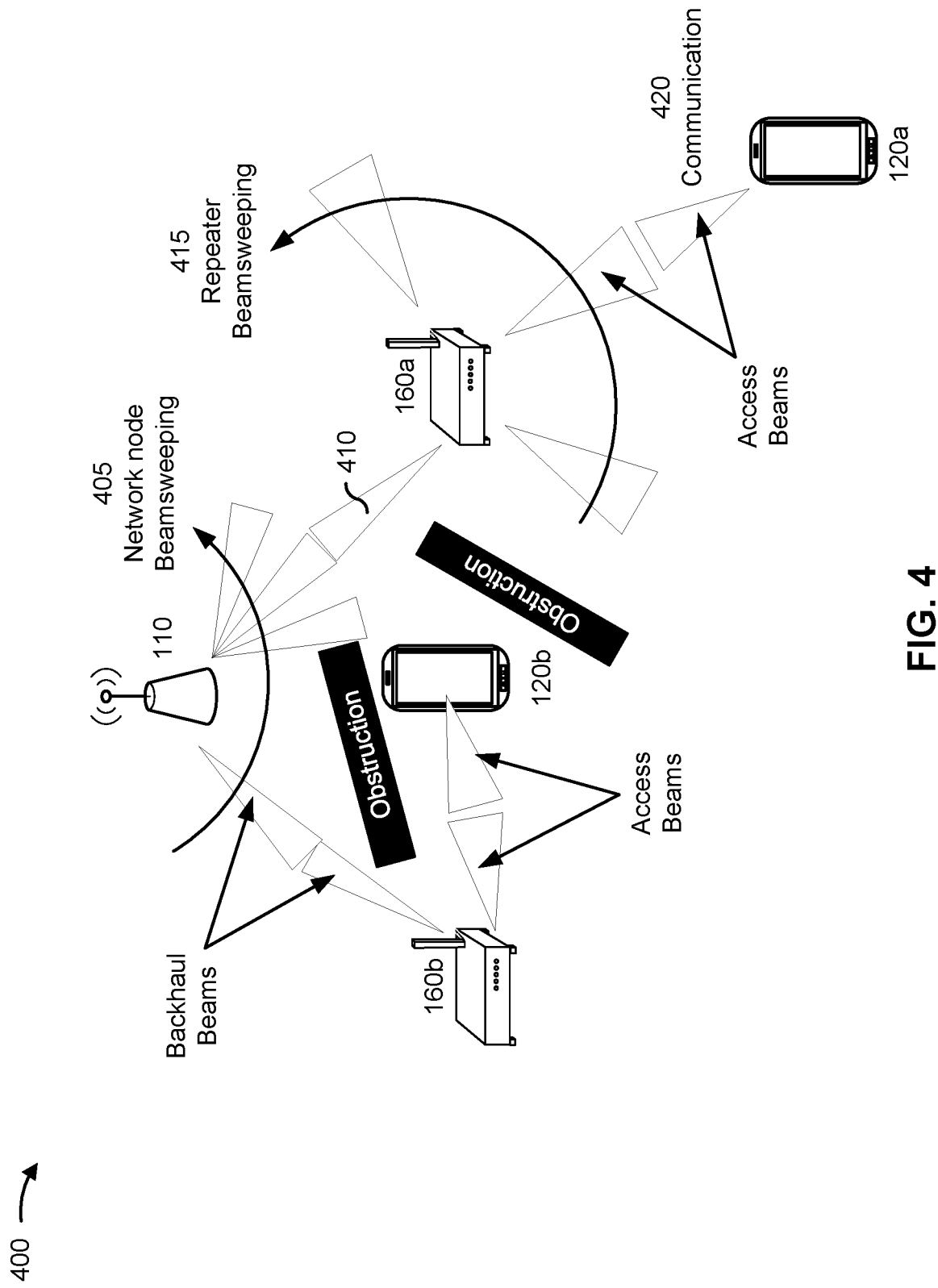
FIG. 4 is a diagram illustrating an example of communicating using a millimeter wave repeater, in accordance with the present disclosure.

FIG. 4 is a diagram illustrating an example 400 of communicating using a millimeter wave repeater, in accordance with the present disclosure.

Because millimeter wave communications have a higher frequency and shorter wavelength than other types of radio waves used for communications (e.g., sub-6 GHZ communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node 110 that communicates using the sub-6 GHz radio waves. However, a millimeter wave may not be capable of penetrating the same wall (e.g., depending on a thickness of the wall and/or a material from which the wall is constructed). Some techniques and apparatuses described herein use a millimeter wave repeater 160 (which includes, in the example of FIG. 4, repeater 160a and repeater 160b) to increase the coverage area of a network node 110 and/or to extend coverage to UEs 120 (which include, in the example of FIG. 4, UE 120a and UE 120b) without line of sight to the network node 110 (e.g., due to an obstruction).

For example, as illustrated in the example of FIG. 4, an obstruction between UE 120b and network node 110 blocks or otherwise reduces the quality of a link between the network node 110 and UE 120b. Similarly, an obstruction between UE 120b and repeater 160a blocks or otherwise reduces the quality of a link between the repeater 160a and the UE 120b. However, no obstructions or fewer obstructions exist between repeater 160b and UE 120b, and, as such, it is possible that communications between repeater 160b and UE 120b will have a higher quality than communications between network node 110 and UE 120b or between repeater 160a and UE 120b. Furthermore, the millimeter wave repeater 160 described herein may be a layer 1 or an analog millimeter wave repeater, which is associated with a lower cost, less processing, and lower latency than a layer 2 or layer 3 repeater.

A millimeter wave repeater 160 (sometimes referred to herein as a repeater 160) may perform directional communication by using beamforming to communicate with a network node 110 via a first beam pair (e.g., a backhaul beam pair over a backhaul link with the network node 110) and to communicate with a UE 120 via a second beam pair (e.g., an access beam pair over an access link with the UE 120). For example, in example 400, repeater 160a can communicate with network node 110 via a first beam pair and can communicate with UE 120a via a second beam pair. Similarly, repeater 160b can communicate with network node 110 via a first beam pair and can communicate with UE 120a via a second beam pair. A beam pair may refer to a transmit (Tx) beam used by a first device for transmission and a receive (Rx) beam used by a second device for reception of information transmitted by the first device via the Tx beam.

As shown by reference number 405, a network node 110 may use a beamsweeping procedure to transmit communications via multiple beams over time (e.g., using time division multiplexing (TDM)). As shown by reference number 410, the repeater 160a may receive a communication via an Rx beam of the repeater 160a. As shown by reference number 415, the repeater 160a may relay each received communication via multiple Tx beams of the repeater 160a (e.g., using TDM). As used herein, relaying a communication may refer to transmitting the received communication (e.g., after amplifying the received communication) without decoding the received communication and/or without modifying information carried in the received communication. Alternatively, relaying a received communication may refer to transmitting the received communication after decoding the received communication and/or modifying information carried in the received communication. In some aspects, a received communication may be relayed using a different time resource, a different frequency resource, and/or a different spatial resource (e.g., a different beam) to transmit the communication as compared to a time resource, a frequency resource, and/or a spatial resource in which the communication was received. As shown by reference number 420, a UE 120a may receive a relayed communication. In some aspects, the UE 120a may generate a communication to be transmitted to the network node 110. The UE 120a may then transmit the communication to the repeater 160a for relaying to the network node 110.

As indicated above, FIG. 4 is provided as an example. Other examples may differ from what is described with regard to FIG. 4.

Figure 5:
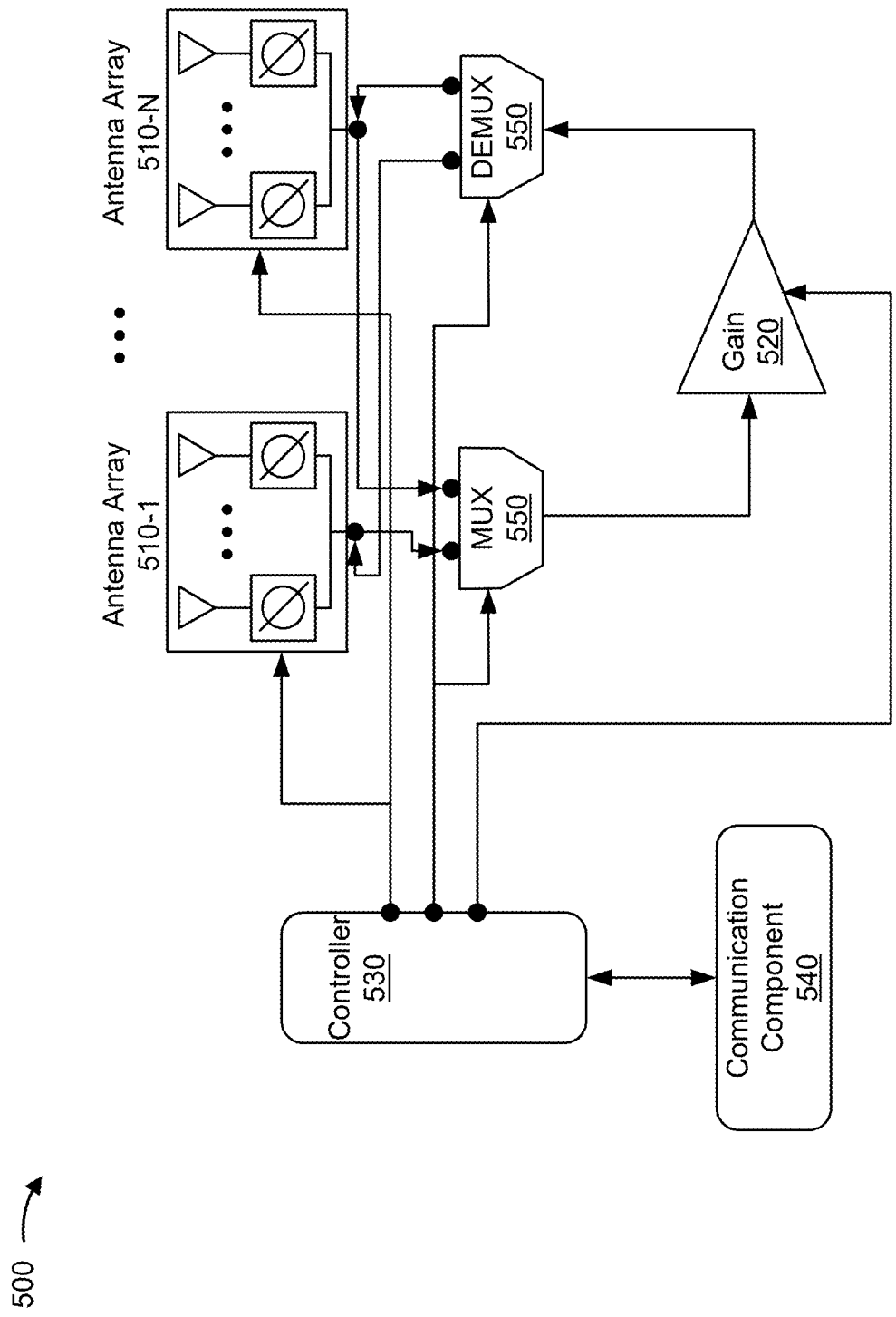
FIG. 5 is a diagram illustrating an example of a millimeter wave repeater, in accordance with the present disclosure.

FIG. 5 is a diagram illustrating an example of a millimeter wave repeater 500. in accordance with the present disclosure. In some aspects, millimeter wave repeater 500 may correspond to millimeter wave repeater 160 shown in FIG. 1. As shown in FIG. 5, the millimeter wave repeater 500 may include one or more antenna arrays 510-1 through 510-N (N>1), a gain component 520, a controller 530, a commu-nication component 540, and a multiplexer (MUX) and/or demultiplexer (DEMUX) (MUX/DEMUX) 550.

An antenna array 510 includes multiple antenna elements capable of being configured for beamforming. For example, an antenna array 510 may be referred to as a phased array because phase values and/or phase offsets of the antenna elements may be configured to form a beam, with different phase values and/or phase offsets being used for different beams (e.g., in different directions). In some aspects, an antenna array 510 may be a fixed receive (RX) antenna array capable of only receiving communications while not transmitting communications. In some aspects, an antenna array 510 may be a fixed transmit (TX) antenna array capable of only transmitting communications while not receiving communications. In some aspects, an antenna array 510 may be capable of being configured to act as an RX antenna array or a TX antenna array (e.g., via a TX/RX switch and/or a MUX/DEMUX). The antenna arrays 510 may be capable of communicating using millimeter waves.

Gain component 520 includes a component capable of amplifying an input signal and outputting an amplified signal. For example, gain component 520 may include a power amplifier and/or a variable gain component. In some aspects, gain component 520 may have variable gain control. The gain component 520 may connect to an RX antenna array (e.g., a first antenna array 510-1) and a TX antenna array (e.g., a second antenna array 510-2) such that an analog millimeter wave signal, received via the RX antenna array, can be amplified by the gain component 520 and output to the TX antenna array for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, and/or a processor. In some aspects, the controller 530 may control the gain component 520 by controlling a level of amplification or gain applied by the gain component 520 to an input signal. Additionally, or alternatively, the controller 530 may control an antenna array 3 510 by controlling a beamforming configuration for the antenna array 5 10 (e.g., one or more phase values for the antenna array 510, one or more phase offsets for the antenna array 510, one or more power parameters for the antenna array 510, one or more beamforming parameters for the antenna array 510, a TX beamforming configuration, and/or an RX beamforming configuration), by controlling whether the antenna array 510 acts as an RX antenna array or a TX antenna array (e.g., by configuring interaction and/or connections between the antenna array 510 and a MUX/DEMUX 550) Additionally, or alternatively, the controller 530 may power on or power off one or more components of millimeter wave repeater 500 (e.g., when a network node 110 does not need to use the millimeter wave repeater to serve UEs 120). In some aspects, the controller 530 may control a timing of one or more of the above configurations.

Communication component 540 may include a component capable of wirelessly communicating with a network node 110 using a wireless technology other than millimeter wave (e.g., via a control interface). For example, the communication component 540 may communicate with the network node 110 using a personal area network (PAN) technology (e.g., Bluetooth or Bluetooth Low Energy (BLE)), a 4G or LTE radio access technology, a narrowband Internet of Things (NB-IoT) technology, a sub-6 GHz technology, a visible light communication technology, and/or the like. In some aspects, the communication component 540 may use a lower frequency communication technology, and an antenna array 510 may use a higher frequency communication technology (e.g., millimeter wave). In some aspects, an antenna array 510 may be used to transfer data between the millimeter wave repeater 500 and the network node 110, and the communication component 540 may be used to transfer control information between the millimeter wave repeater 500 and the network node 110 (e.g., a report, a configuration, and/or instructions to power on or power off one or more components).

MUX/DEMUX 550 may be used to multiplex and/or demultiplex communications received from and/or transmitted to an antenna array 310. For example, MUX/DEMUX 550 may be used to switch an RX antenna array to a TX antenna array.

In some aspects, the millimeter wave repeater 500 does not include any components for digital signal processing. For example, in some aspects, the millimeter wave repeater 500 does not include a digital signal processor, a baseband processor, a digital-to-analog converter (DAC), and/or an analog-to-digital converter (ADC). In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antenna arrays 510, gain component 520, controller 530, communication component 540, and/or MUX/DEMUX 550 may perform one or more techniques associated with communicating with and/or configuring a millimeter wave repeater, as described in more detail elsewhere herein. For example, one or more components of millimeter wave repeater 500 may perform or direct operations of, for example, process 900 of FIG. 9, and/or other processes as described herein. In some aspects, the millimeter wave repeater 500 includes a transceiver. The transceiver may include any combination of antenna arrays 510, gain component 520, controller 530, communication component 540, MUX/DEMUX 550, and/or a memory. The transceiver may be used by a processor (e.g., controller 530) and the memory to perform aspects of any of the methods described herein, for example, as described with reference to FIGS. 7-10 In some aspects, the memory may comprise a non-transitory computer-readable medium storing one or more instructions for wireless communication. For example, the one or more instructions, when executed (e.g., directly, or after compiling, converting, and/or interpreting) by one or more processors of the millimeter wave repeater 500, may perform or direct operations of, for example, process 900 of FIG. 9, and/or other processes as described herein. In some aspects, executing instructions may include running the instructions, converting the instructions, compiling the instructions, and/or interpreting the instructions.

In some aspects, millimeter wave repeater 500 may include means for receiving control information via a UE entity of the repeater, the control information associated with operation of a wideband entity and a narrowband entity of the repeater; means for receiving synchronization information via the narrowband entity, the synchronization information associated with synchronization of wideband communications of the wideband entity; and/or means for receiving and forwarding the wideband communications via the wideband entity and based at least in part on the control information and the synchronization information; among other examples. In some aspects, such means may include one or more components of millimeter wave repeater 500 described in connection with FIG. 5, such as one or more antenna arrays 510, gain component 520, controller 530, communication component 540, and/or MUX/DEMUX 550.

As indicated above, FIG. 5 is provided as an example. Other examples may differ from what is described with regard to FIG. 5. For example, millimeter wave repeater 500 may include additional components, fewer components, different components, or differently arranged components than those shown in FIG. 5. Furthermore, two or more components shown in FIG. 5 may be implemented within a single component, or a single component shown in FIG. 5 may be implemented as multiple components. Additionally, or alternatively, a set of components (e.g., one or more components) of millimeter wave repeater 500 may perform one or more functions described as being performed by another set of components of millimeter wave repeater 500.

Figure 6:
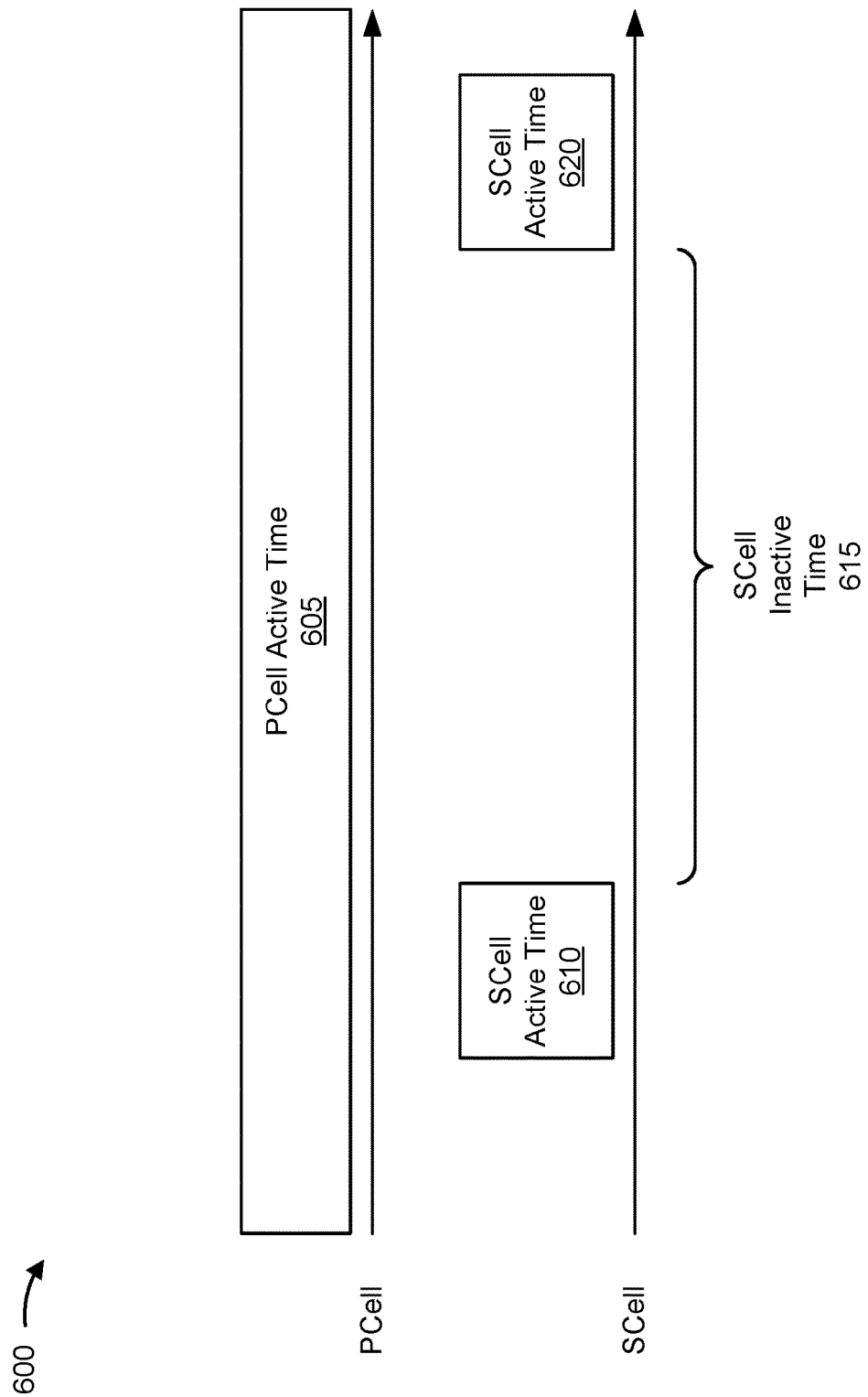
FIG. 6 is a diagram illustrating an example of communicating using a primary cell (PCell) and a secondary cell (SCell), in accordance with the present disclosure.

FIG. 6 is a diagram illustrating an example 600 of communicating using a PCell and an SCell, in accordance with the present disclosure. For example, a UE may communicate with a network node using an NSA connection where the PCell provides an anchor, and the SCell provides increased throughput capacity when needed. The PCell may be part of a PCell group, and/or the second cell may be part of an SCell group. The PCell may be associated with a first FR and/or a first RAT, and the SCell may be associated with a second FR and/or a second RAT (e.g., with the first and second FRs being different and/or the first and second RATs being different).

As shown in FIG. 6, the UE and the network node may communicate during a PCell active time 605. The PCell active time 605 may include a time during which a communication link is established, and the UE and network node are connected.

During the PCell active time 605, the UE and the network node may also communicate via the SCell during an SCell active time 610. The UE and the network node may communicate via the SCell active time 610 based at least in part on an amount of data for communication satisfying a threshold (e.g., exceeding a throughput capacity of the PCell).

The network node may release the SCell for an SCell inactive time 615. The network node may release the SCell to conserve computing, power, communication, and network resources. The network node may again activate the SCell for an SCell active time. For example, the network node may activate the SCell for the SCell active time 620 based at least in part on receiving (e.g., from an application server in communication with the UE) an increased amount of data for the UE, with the increased amount of data satisfying a threshold (e.g., exceeding a throughput capacity of the PCell).

As indicated above, FIG. 6 is provided as an example. Other examples may differ from what is described with regard to FIG. 6.

In some networks using high frequency signaling, such as a sub Terahertz (SubThz) band, signals may have a relatively high propagation loss and a relatively small coverage area when compared with networks using lower frequency signaling. To compensate for the relatively high propagation loss and relatively small coverage area, the network may deploy repeaters to extend coverage of the network. For example, a network node may transmit a communication to a UE that is out of range of the network node. The repeater may receive the communication and then forward the communication (e.g., after amplifying the communication) to the UE, similarly, the repeater may receive an uplink communication from the UE and then forward the communication to the network node.

In some networks, the repeater may establish a first link with the network node via a PCell and may establish a second link with the network node via a SCell. The PCell may be used to exchange information between the network node and the repeater, and the SCell may be used to communicate between the network node and the UE via the network node. The SCell may operate using high frequency signaling and the PCell may operate using a relatively low frequency signaling. In this way, the PCell may have greater coverage than the SCell and/or may provide communications with relatively low error rates, which the SCell may support a higher throughput for communications between the network node and the UE.

In some networks, an SCell may have a minimum scope of critical functionality (e.g., relying on a PCell and/or lower frequency band cell for some functionality). For example, a network node may not transmit an "always on" signal, such as a synchronization signal block (SSB) or other reference signal (RS) that a UE can use to synchronize with the network node over the SCell. In some networks, the SCell may be active for sporadic and/or short time sessions with a burst activity pattern.

In some networks, the SCell (e.g., a subTHz-based SCell) may operate using one or more hops between the UE and the network node. For example, the one or more hops may traverse one or more power-efficient, smart repeaters (repeaters (RPs) and/or access points (APs), among other examples) with out-of-band control using the PCell.

Smart repeaters (e.g., for subTHz) may have functional parts, such as a REDCAP UE entity for PCell connectivity (e.g., to deliver out-of-band control messages, reports, and/or feedbacks, among other examples), wideband analog amplify & forward (AF) functionality for data forwarding, a dedicated narrowband local SSB and/or synchronization RS transmission and/or reception capability over the SCell (e.g., using subTHz carrier frequencies) for complementary time synchronization and beam refinement processing. A communication link between the UE and the network node may have progressive synchronization across hops, hop-specific synchronization, and beam management sessions with customized synchronization RSs and/or SSB mini-burst scheduling.

When an SCell or a PCell operate at different FRs and/or with different RATs, or otherwise operate with different latency between a UE and a network node, synchronization with the PCell may not be sufficient for synchronization with the SCell. Based at least in part on the SCell link not being continuously active with "always on" signals or other synchronization signals when not actively communicating via the SCell, the UE and/or any smart repeaters along the communication link may need to synchronize before beginning communication to avoid communication errors that may have otherwise been caused by timing errors. However, performing a full synchronization procedure and/or a beam management procedure may consume an amount of time that causes data to fail a latency requirement. Additionally, or alternatively, performing a full synchronization procedure may consume power resources unnecessarily. In this way, activating the SCell may provide an increased throughput capacity, but may cause communication errors while the UE synchronizes with the network node via the SCell.

In some aspects described herein, the UE and/or a repeater (e.g., a smart repeater, an AP, and/or an RP, among other examples) may perform synchronization (e.g., time and/or frequency synchronization) with the network node for the SCell, with the synchronization based at least in part on a PCell synchronization. For example, a wireless communication device (e.g., the UE and/or the repeater) may obtain synchronization with the PCell of a wireless network (e.g., using RSs of the PCell). The wireless communication device may receive an indication to activate an SCell of the wireless network and may receive an RS of the SCell. The wireless communication device may obtain synchronization with the SCell based at least in part on an offset between the RS of the SCell and a reference time of the PCell. The reference time may be based at least in part on the synchronization with the PCell. Once synchronized with the SCell, the wireless communication device may communicate via the SCell. By obtaining synchronization with the SCell based at least in part on an offset between the RS of the SCell and a reference time of the PCell, the network may support acquisition of synchronization over the SCell (e.g., across all hops) in a reduced amount of time as compared to a full synchronization procedure. Additionally, or alternatively, the wireless communication device may conserve power resources that may have otherwise been consumed by performing a full synchronization procedure over the SCell.

The SCell time synchronization session (which may include also a beam management synchronization) may be scheduled and/or performed by the network node via the PCell. For example, SCell time synchronization session may be scheduled and/or performed by the network node per link activation (e.g., an indication to activate the SCell), per pre-defined time period and/or periodicity along a long-lasting active SCell-based data offloading session, and/or as an event driven synchronization session scheduled during an active data offloading session responsive to one or more events, among other examples.

In some aspects, a time synchronization session may be based at least in part on a synchronization session configuration for a reception side (and transmission side of intermediate hops) that is indicated and/or performed over a PCell link and with reference to PCell timing. In some aspects, the time synchronization session may use PCell timing information for coarse time synchronization and/or referencing to define time search boundaries and/or a time uncertainty for an SCell local synchronization session per SCell link activation. A wireless communication device (e.g., a downstream wireless communication device) may estimate fine timing (e.g., a delta timing offset) for the SCell with respect to a configured reception time for the SCell synchronization session based at least in part on a PCell timing, slot, and/or control signaling slot. In this way the wireless communication device may have no independent TTL on the SCell, and the SCell time synchronization is obtained based at least in part on the PCell coarse time and a locally estimated relative timing offset. In some aspects, an overall time synchronization per multi-hop link may be established using a progressive synchronization approach.

In some aspects, an SCell control message may be signaled over the PCell with reference to (e.g., as a timing reference for determining and/or application of the timing offset) a PCell downlink slot index, a PCell symbol within a downlink slot, a PCell downlink slot carrying the control message (e.g., physical downlink control channel (PDCCH)), a scheduling event on the PCell for either the PCell or the SCell (e.g., indicated relative to this scheduling and based on PCell timing), and/or an additional time offset relative to any of the previous references. In some aspects, the additional time offset may be indicated and/or configured for synchronization with the SCell.

In some aspects, a relative offset in SCell time units (e.g., symbols and/or slots) may be provided for an SCell control application for communications assumed to be scheduled via the SCell. For example, every PCell slot and/or symbol may include multiple SCell slots/symbols, so the SCell control information (e.g., scheduling DCI) may indicate a timing of subsequent SCell time units with reference to a PCell time unit. SCell control information may indicate scheduling of synchronization RSs and/or associated reception and/or transmission time, scheduling of SCell data and/or a forwarding operation, and/or scheduling of SCell link adaptation (LA) RS, among other examples.

Based at least in part on using the PCell synchronization for SCell synchronization, the network may support acquisition of synchronization over the SCell (e.g., across all hops) in a reduced amount of time and/or may conserve power resources that may have otherwise been used to perform full synchronization using only SCell signals.

Additionally, or alternatively, a progressive synchronization approach supports low latency and low power multi-hop link synchronization with smart repeaters having a PCell-based out-of-band control. For example, in a network with one or more repeaters between a UE and a network node, using the PCell-based (e.g., out-of-band for the SCell) timing to assist in synchronization of the SCell, each of the one or more repeaters may conserve power resources that may have otherwise been consumed by funny synchronizing using only SCell signaling.

Further, using the PCell synchronization for SCell synchronization may support faster SCell link activation and deactivation for eligible UEs with low complexity, low power, and low latency penalties to support a burst activity pattern for improved power efficiency. For example, the wireless communication device may obtain synchronization of the SCell more quickly than if using only SCell signaling. In this way, use of the SCell for intermittent, burst, and/or high throughput communications when needed to temporarily supplement the PCell may be optimized for efficiency in consumption of power resources.

In some aspects, using the PCell synchronization for SCell synchronization may extend a range of use cases and scenarios where SCells having relatively high FRs may be used with reasonable implementation and deployment implications (e.g., with relatively fast SCell link activation and reduced power consumption). Further, using the PCell synchronization for SCell synchronization may speed up initial high-FR (e.g., subTHz) deployments (e.g., with a strong reliance on lower frequency bands).

In some aspects described herein, the repeater may include a wideband entity configured to perform analog A&F for SubThz and/or SCell data forwarding, an narrowband entity (e.g., an narrowband digital unit) to perform SubThz and/or SCell local synchronization and beam management RF processing, and a REDCAP UE entity to support lower band and/or PCell connectivity for receiving out-of-band control information based at least in part on the PCell for the repeater.

The wideband entity (also referenced as a wideband analog A&F unit) may be used for analog A&F operations for wideband data that is offloaded (e.g., from a PCell) over a SubThz link. The wideband entity may use a lens antenna and/or beamformer for reduced power consumption relative to a conventional array beamformer. For example a lens may be placed outside of an emitter (e.g., an antenna clement) and may change an angle of a signal transmitted from, or directed to, the emitter. In this way, the lens may increase angular separation between beams associated with the emitter and/or between a beam associated with the emitter and an additional beam associated with an additional emitter.

The beamformer and/or lens antenna may be used on both link directions of the repeater (e.g., uplink and downlink directions). For AP repeaters, the beamformer and/or lens antenna may be used only for an infrastructure link (e.g., with another repeater or network node) since a direct UE access may require an array-based beamformer with wide spatial span support and multiple flexible beams or beamforming capabilities.

Each beam supported by the beamformer may have a dedicated RF path (e.g., Tx and/or Rx sides) and beam selection may be done by means of an RF switch (e.g., selection of a corresponding path). This RF switch may be located post low noise amplifier (LNA) on the reception side to reduce degradation and/or a negative impact of RF chain Noise Figure (NF) cause by an RF switch Insertion Loss (IL) that is may be proportional to a number of switched paths and/or reception beams (e.g., if placed before the LNA, the NF may result in NF'=NF+IL). On the transmission side, an RF switch (e.g., transmission beam selector) may be placed before a power amplifier (PA). Correspondingly, an RF switch IL may not impact a link budget.

In some aspects, only a selected LNA and a selected PA are on for each beam transmission and reception, and the selected PA and selected LNA have control information that is aligned with the RF switch selection and/or configuration. Activating only a single LNA that is being placed before the RF switch may allow a beam leakage reduction for the beamformer on the reception side (non-activated LNAs effectively reduce a corresponding RF path leakage in the RF switch).

Similarly, placing the RF switch before and activating only the selected PA corresponding to a targeted transmission beam may allow a reduction in an RF switch related leakage for the transmission-side perspective (e.g., reduction in beams leakage on the transmission side).

Usage of different carrier frequencies and/or subbands (freq1/freq2) may improve reception and transmission separation (e.g., via the frequency domain) for the repeater. This may reduce RF leakage loops and/or stability issues, which may correspondingly increase an operational amplification on the repeater side and a link range accordingly. Freq1/freq2 may correspond to different SubThz bands within a D-band or a different fraction of a single SubThz band.

Tx/Rx separation via the frequency domain may be based at least in part on band pass filters (BPFs) added before the LNA. Using separate frequencies may require frequency conversion by the repeater (e.g., along a WB A&F analog path). WB data processing may be fully analog for SubThz for improved energy efficiency.

The narrowband entity (also referred to as an NB digital processing unit) may be introduced at the repeater to support NB RS transmission or reception over a SubThz link (e.g., a dedicated SSB sync&BM RS Tx/Rx capability).

The narrowband entity may support SubThz local complementary synchronization, beam management procedures, and/or dynamic link establishment with progressive synchronization. For example, the narrowband entity may support low complexity, low power, low latency synchronization and beam management for dynamic multi hop SubThz or SCell link activation.

The narrowband entity may generate a narrowband transmission signal (e.g., a sync&BM RS) to be transmitted to the next node (e.g., a downstream node) via a reduced list of swept transmission beams to support customized a per-hop sync&BM session.

The narrowband entity may process and/or detect a narrowband reception signal (e.g., a synch& BM RS) received from a previous node (e.g., an upstream node and/or the network node) for a progressive link establishment procedure (e.g., sweeping a reduced list of transmission and reception beams per-hop for SubThz local complementary sync&BM procedures).

The narrowband entity may include a smart repeater controller that receives control information from the PCell (e.g., out-of-band control information) and translates the control information into a local hardware control (e.g., for wideband analog and narrowband digital blocks and other synchronization and interconnection related hardware). The smart repeater controller may provide controls for the wideband analog component such as an On/Off indication (e.g., a dynamic link or repeater activation and deactivation), beam control for an analog transceiver, direction control for the analog transceiver, a time domain duplexing pattern control for the analog transceiver (e.g., uplink and downlink resources), gain control (e.g., for fractional bandwidth-related optimizations and/or balanced link budget over different multi-hop link parts or hops), and/or a narrowband digital or wideband analog data path selector for an RF switch, among other examples.

The UE entity of the repeater (e.g., a REDCAP entity) may be used to maintain a continuous link via a PCell with low power consumption relative to the SCell that uses a SubThz band. PCell connectivity may be used to deliver out-of-band control for the repeater (and/or an additional repeater or function) involving scheduling control and/or reporting (e.g., reports sent by the repeater to the network node via the Pcell as a response to a sync&BM session on the corresponding hop). The out-of-band control may indicate information associated with subscription procedures and SubThz configurations for the SubThz smart repeater (e.g., an radio resource control (RRC) connection), SubThz-based traffic offloading session activation if preconditions are met (e.g., an SCell activation/deactivation mechanism can be reused for repeaters activation/deactivation), dynamic SubThz time domain duplexing patterns indications (e.g., UL/DL slots indications), and/or configurations for the sync&BM sessions for transmission and/or reception sides of link parts or hops (e.g., a list of beams and associated time/frequency resources by referencing to PCell timing), among other examples. The out-of-band control may indicate information associated with SubThz beam management reports and "In Sync" status indications from the repeater to the network node, and/or forwarding configurations for the repeater (e.g., a beam indication+time domain duplexing pattern), power control for fractional bandwidth-related optimizations and balanced link budget over different link parts or hops, and/or SubThz session termination indications for the repeater (e.g., SCell deactivation for an AP or repeater).

PCell connectivity may be used to derive or allow coarse synchronization in a time domain and acquire or track frequency synchronization (e.g., ppm_error) by the repeater for a corresponding SubThz/SCell hop and/or coarse beam determination for SubThz. In some aspects, the repeater may use shared local oscillators (e.g., shared between one or more of the UE entity, the narrowband entity, and/or the wideband entity), shared clocks or clock references, and/or shared time counters between the entities and/or components of the repeater. For example sharing between a wideband A&F analog component, a narrowband digital processing component for sync& BM sessions, a REDCAP UE entity (e.g., a REDCAP SoC). The REDCAP UE entity may be a source or master for the timing information.

In some aspects, the UE entity may include a global positioning system (GPS) module or other location module to provide location information for semi-static repeaters (e.g., repeaters that may change location). Location information may be used for reduced complexity of an initial beam search for a first repeater activation after a location change. Additionally, or alternatively, location information may be obtained based on positioning procedures over the PCell (e.g., via the REDCAP UE entity).

In some aspects, the repeater may provide intermediate infrastructure hops and/or links with different transmission-side and reception-side frequencies on the same or different SubThz bands. If the repeater is an access point (AP) repeater (providing local SubThz coverage and having a direct link with a SubThz UE), the repeater may have some BF-related features that differ from a non-AP repeater.

Based at least in part on the repeater including the wideband entity, the narrowband entity, and the UE entity, the repeater may improve power efficiency, power consumption, and coverage in a high frequency network, such as a SubThz network. Additionally, or alternatively, the repeater may support out-of-band control over a PCell link for improved power consumption, which may allow an increased number of repeaters that can be supported under a coverage range of the Pcell coverage range (e.g., improving synchronization signal block (SSB) scalability and direct link or indirect link association ambiguity). Further, the repeater may support reduced latency for SubThz activation or deactivation for improved power efficiency, may support an extended range of use cases where SubThz can be applicable with reasonable implementation and deployment implications, and/or reduced time for initial SubThz deployments by using lower frequency bands. Additionally, or alternatively, the repeater may support multi-hop link synchronization procedures when a high number of repeaters is involved in multi-hop link establishment and/or fast "in sync" state acquisition over the SubThz and/or SCell (e.g., across all hops) via a sequence of back-to-back hop-specific synchronization sessions.

Figure 7:
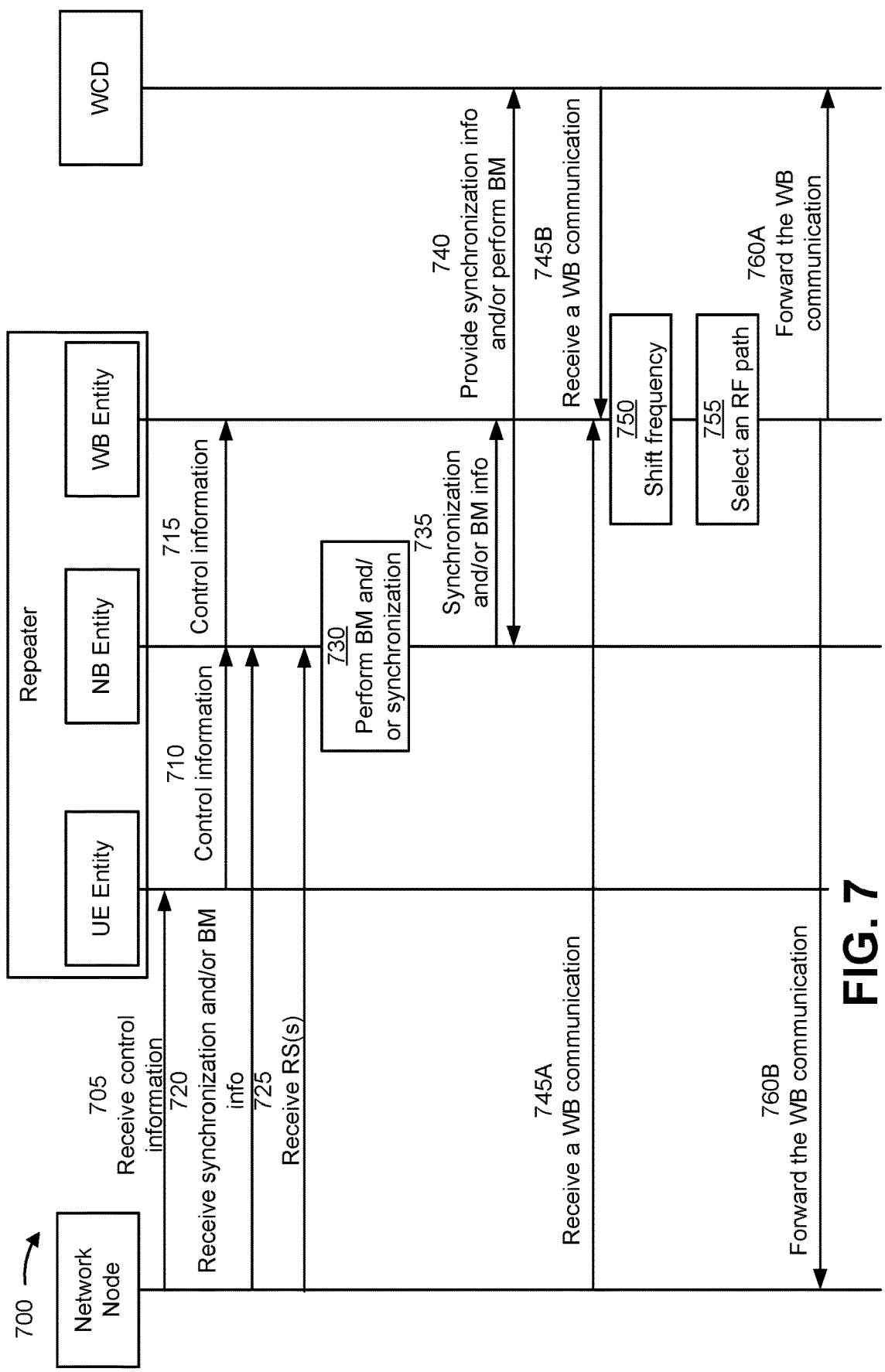
FIG. 7 is a diagram of an example associated with repeaters in accordance with the present disclosure.

FIG. 7 is a diagram of an example 700 associated with repeaters in accordance with the present disclosure. As shown in FIG. 7, a network node (e.g., network node 110, a CU, a DU, and/or an RU) may communicate with a repeater (e.g., a network node that includes a UE entity or mobile terminal), and a wireless communication device (WCD) (e.g., UE 120 or an additional repeater). In some aspects, the network node and the WCD may be part of a wireless network (e.g., wireless network 100) that the repeater supports. The UE and the network node may have established a wireless connection prior to operations shown in FIG. 7 and the repeater may have established a connection with the network node and the WCD prior to the operations shown in FIG. 7.

As shown by reference number 705, the repeater may receive, and the network node may transmit, control information via a UE entity of the repeater. In some aspects, the UE entity may include a UE, such as a full capability UE entity or a REDCAP UE entity. The network node may transmit the control information to the UE entity based at least in part on the UE entity being an endpoint for communications with the network node. A wireless connection between the network node and the UE entity may be a Uu connection through which the UE and the network node communicate with each other. In contrast, the repeater may use a narrowband entity and a wideband entity to facilitate communications between the network node and the WCD where the repeater is not an endpoint for the communications. When using the narrowband entity and the wideband entity, the repeater may not decode communication and/or may not demodulate the communications before forwarding the communications to the network node or the WCD, depending on whether the communications originated from the WCD or the network node.

Additionally, or alternatively, the network node may communicate with the repeater via the UE entity on a first frequency band (e.g., a PCell) and may communicate with the repeater via the narrowband entity or the wideband entity on a second frequency band (e.g., an SCell). In some aspects, the PCell associated with the UE entity may operate with an "always on" reference signal, such as an synchronization signal block (SSB), that maintains synchronization between the UE entity and the network node in the PCell or may communicate with reduced latency requirements that allow the UE entity to reestablish a connection via the PCell before receiving the control information. In some aspects, the SCell may operate as an "on-demand" connection between the narrowband entity or wideband entity and the network node, which connection can be turned on or off based on need for forwarding communications between the network node and the WCD. The narrowband entity and the wideband entity may use information (e.g., synchronization information and/or scheduling information, among other examples) from the PCell to improve latency of reestablishing the SCell connection.

The control information may be associated with operation of the wideband entity and/or the narrowband entity of the repeater. In some aspects, the UE entity may receive the control information via a bandwidth (e.g., a channel and/or frequency band) that is lower than a bandwidth of the wideband communications used with the wideband entity. In some aspects, the UE entity may receive the control information via a PCell and the wideband communications may be associated with an SCell.

In some aspects, the control information may include an on or off state for the wideband entity, beam control for the wideband communications, direction control for the wideband communications, time domain duplexing control for the wideband communications, gain control for the wideband communications, a path selector for a radio frequency switch, and/or course synchronization information, among other examples.

As shown by reference number 710, the UE entity may provide the control information to a narrowband (NB) entity of the repeater. In some aspects, the UE entity may decode the control information and may provide control signaling to the narrowband entity.

In some aspects, the narrowband entity of the repeater may operate at a high frequency band (e.g., SubThz) that is higher than an frequency band at which the UE entity operates. In some aspects, a wideband entity of the repeater may operate at a same frequency band as the narrowband entity. In some aspects, the narrowband entity and the wideband entity may receive signaling from the network node via a same set of antennas.

As shown by reference number 715, the narrowband entity may provide the control information to the wideband (WB) entity. In some aspects, the narrowband entity may decode and/or process the control information and may provide control signaling to the wideband entity for operations involving wideband communications between the network node and the WCD. In some aspects, the wideband entity may include an A&F component.

As shown by reference number 720, the repeater may receive, and the network node may transmit, synchronization and/or beam management (BM) information at a narrowband entity of the repeater. In some aspects, the synchronization information may be associated with synchronization of wideband communications of the wideband entity and/or coarse synchronization of narrowband communications of the narrowband entity (e.g., usable for fine synchronization of wideband communications). For example, the repeater may receive coarse synchronization information and/or BM information from the network node via a narrowband indication.

In some aspects, the repeater may receive the synchronization and/or BM information via the narrowband entity based at least in part on the narrowband entity operating within a same frequency range and frequency band as the wideband entity, and with a reduced overhead and power consumption in comparison with receiving the synchronization and BM information via the wideband entity. In some aspects, synchronization and/or BM information for the UE entity (e.g., operating in a first frequency band and/or frequency range) may be different from synchronization and/or BM information for the narrowband entity and the wideband entity (e.g., operating in a second frequency band and/or frequency range). For example, based at least in part on the narrowband entity and the wideband entity operating at a high frequency band (e.g., SubThz) and the UE entity operating at a low frequency band (e.g., FR1, FR2, or Sub 6 Mhz), numerology may be different, which may cause synchronization to be different for the SCell and the PCell. Additionally, or alternatively, based at least in part on the narrowband entity and the wideband entity operating at a high frequency band and the UE entity operating at a low frequency band, beamwidths may be different which may cause beam identifiers to be different for the SCell and the PCell.

As shown by reference number 725, the repeater may receive, and the network node may transmit, one or more RSs at the narrowband entity. In some aspects, the narrowband entity may receive the one or more RSs via a same set of antennas (e.g., lens antennas or beamformers) that are used for wideband A&F or other communications of the wideband entity.

As shown by reference number 730, the repeater may perform beam management and/or synchronization (e.g., at the narrowband entity) based at least in part on the one or more RSs. The beam management and/or synchronization may be associated with wideband communications. For example, the narrowband entity may use narrowband signals (e.g., the one or more RSs) that span a part or all of a wideband used by the wideband entity. The narrowband signals may have a same numerology as the wideband, which may allow the repeater to use the narrowband signals to obtain timing synchronization for the wideband. Additionally, or alternatively, based at least in part on operating within the same frequency range and/or frequency band, the narrowband signals and the wideband may use a same set of beams. In this way, the narrowband entity may identify beams and/or synchronization using the narrowband signals, with the beams and/or synchronization being usable by the wideband entity.

As shown by reference number 735, the narrowband entity may provide the synchronization and/or beam management information to the wideband entity for use in communication via wideband links with the network node and/or the WCD.

As shown by reference number 740, the narrowband entity may provide synchronization information and/or may perform beam management with the WCD. For example, the WCD may be an additional repeater, and may perform synchronization and/or beam management for a hop between the repeater and the WCD.

As shown by reference number 745A, the repeater may receive via the wideband entity, and the network node may transmit, a wideband communication. The wideband communication may be intended for forwarding to the WCD.

In some aspects, the repeater may receive the wideband communication via a first beam selected from a first set of beams. Each beam of the first set of beams associated with a different RF path.

As shown by reference number 745B, the repeater may receive via the wideband entity, and the WCD may transmit, a wideband communication. The wideband communication may be intended for forwarding to the network node.

In some aspects, the repeater may receive the wideband communication via a second beam selected from a second set of beams. Each beam of the second set of beams associated with a different RF path.

As shown by reference number 750, the wideband entity may shift a frequency of the wideband communication (e.g., from the network node or the WCD). For example, the repeater may receive the communication via a first frequency bandwidth and forward the communication via a second frequency bandwidth. In some aspects, a highest frequency of the first frequency bandwidth is less than a lowest frequency of the second frequency bandwidth by an amount that satisfies a threshold (e.g., zero or greater). In some aspects, a highest frequency of the second frequency bandwidth is less than a lowest frequency of the first frequency bandwidth by an amount that satisfies the threshold.

To shift the frequency of the communication, the wideband entity may provide signaling of the communication to one or more band pass filters and provide the signaling of the communication to a transmission amplifier after providing the signaling to the one or more band pass filters and before forwarding the communication.

Alternatively, the repeater may receive the communication via the first frequency bandwidth and forward the communication via the first frequency bandwidth.

As shown by reference number 755, the wideband entity may select an RF path for receiving and forwarding the communication. In some aspects, the wideband entity may select the RF path based at least in part on the control information received via the UE entity.

In some aspects, the wideband entity may select a first RF path associated with the first beam. In some aspects, the wideband entity may select the first RF path based at least in part on using a first RF switch located after a reception amplifier (LNA) on a reception path. The RF path may include selection of a forwarding path using a second RF switch located before a transmission amplifier (PA). In some aspects, the wideband entity may deactivate reception amplifiers except for the used (e.g., selected) reception amplifier and/or may deactivate transmission amplifiers except for the used (e.g., selected) transmission amplifier. In this way, the wideband entity may conserve power and/or reduce amplifier leakage from unused amplifiers.

As shown by reference number 760A, the repeater may forward, and the WCD may receive, the wideband communication (e.g., based at least in part on the repeater receiving the communication from the WCD).

In some aspects, the repeater may forward the wideband communication via a third beam selected from the second set of beams. In some aspects, the third beam may be the same as the second beam.

As shown by reference number 760B, the repeater may forward, and the network node may receive, the wideband communication (e.g., based at least in part on the repeater receiving the communication from the network node).

In some aspects, the repeater may forward the wideband communication via a fourth beam selected from the first set of beams. In some aspects, the fourth beam may be the same as the first beam.

Based at least in part on the repeater including the wideband entity, the narrowband entity, and the UE entity, the repeater may improve power efficiency, power consumption, and coverage in a high frequency network, such as a SubThz network. Additionally, or alternatively, the repeater may support out-of-band control over a PCell link for improved power consumption, which may allow an increased number of repeaters that can be supported under a coverage range of the Pcell coverage range (e.g., improving synchronization signal block (SSB) scalability and direct link or indirect link association ambiguity). Further, the repeater may support reduced latency for SubThz activation or deactivation for improved power efficiency, may support an extended range of use cases where SubThz can be applicable with reasonable implementation and deployment implications, and/or reduced time for initial SubThz deployments by using lower frequency bands. Additionally, or alternatively, the repeater may support multi-hop link synchronization procedures when a high number of repeaters is involved in multi-hop link establishment and/or fast "in sync" state acquisition over the SubThz and/or SCell (e.g., across all hops) via a sequence of back-to-back hop-specific synchronization sessions.

As indicated above, FIG. 7 is provided as an example. Other examples may differ from what is described with respect to FIG. 7.

Figure 8:
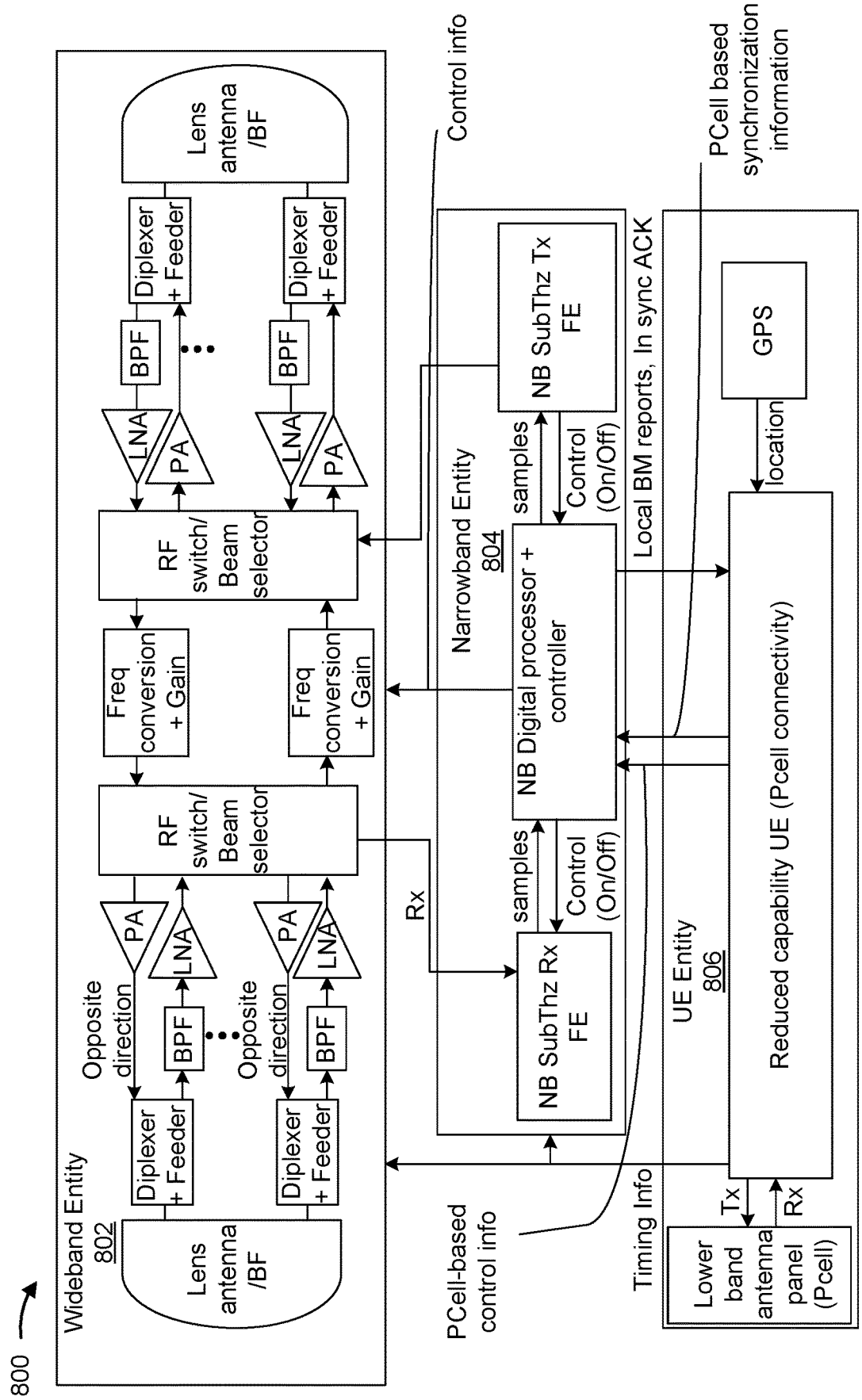
FIG. 8 is a diagram illustrating an example of a repeater, in accordance with the present disclosure.

FIG. 8 is a diagram illustrating an example of a repeater 800, in accordance with the present disclosure. In some aspects, repeater 800 may correspond to millimeter wave repeater 160 shown in FIG. 1.

As shown in FIG. 8 the repeater 800 may include a wideband entity 802, a narrowband entity 804, and a UE entity 806. The wideband entity 802 and the narrowband entity 804 may operate within a same frequency band (e.g., a SubThz band). The wideband entity 802 and the narrowband entity 804 may share hardware. such as a lens antenna or beamformer, a diplexer and feeder, a bandpass filter, an amplifier (e.g., LNA and/or PA), and/or an RF switch and/or beam selector.

The UE entity may operate within a different frequency band (e.g., sub-6 and/or mmW bands) that have a relatively larger coverage area and/or reduced power for communications (e.g., based at least in part on reduced propagation losses).

As shown in FIG. 8, the UE entity 806 may receive communications via a lower band antenna panel (e.g., on a PCell). The communications may include data and/or control information. For example, the UE entity 806 may receive control information associated with operation of the narrowband entity 804 and/or the wideband entity 802. In some aspects, the UE entity 806 may include a GPS module that provides location information to a processor of the UE entity.

The UE entity 806 may provide timing information to the narrowband entity 804 and the wideband entity 802, such as a local oscillator input, a time counter, and/or information from a master clock. The UE entity 806 may provide PCell-based control information to the narrowband entity 804, such as activation/deactivation indications, a local SubThz synchronization session configuration (e.g., for transmission and/or reception), an A&F duration (e.g., time division duplexing pattern), an A&F beam control, and/or an A&F gain reduction, among other examples. The UE entity 806 may provide PCell-based synchronization information to the narrowband entity, such as ppm error, PCell timing (e.g., for coarse synchronization), and/or coarse beam information, among other examples.

A narrowband digital processor and controller may use information from the UE entity 806 to provide control information (e.g., on/off controls) to a narrowband SubThz reception front end (FE) for SSB and/or synchronization RS reception. Similarly, the narrowband digital processor and controller may use information from the UE entity 806 to provide control information (e.g., on/off controls) to a narrowband SubThz transmission FE for SSB and/or synchronization RS transmission (e.g., for synchronization of a subsequent hop).

In some aspects, the narrowband digital processor and controller may use information from the UE entity 806 to provide control information to the wideband entity 802. For example, the network digital processor and controller may provide on/off controls, beam control, time division duplexing patterns and/or directions, gain control, and/or narrowband or wideband selector controls to the wideband entity.

In some aspects, the wideband entity 802 may receive signals (e.g., wideband or network signals) via the lens antenna and/or beamformer. The wideband entity 802 may provide received signals to a diplexer and feeder, which may provide the signals to a band pass filter (BPF). The signals may then pass to an LNA (e.g., a reception amplifier) that is selected to be active based at least in part on a beam selected via a beam management operation of the narrowband entity 804 and/or the UE entity 806.

The RF switch and/or beam selector may provide the received signals to a frequency conversion and/or gain component. In some aspects, the frequency conversion and/or gain component may use one or more BPFs to shift a frequency of the received signals from a received frequency to a different (e.g., non-overlapping) frequency for forwarding.

The frequency conversion and gain component may provide the signal to an RF switch and/or beam selector that provides the signal to a selected PA. The PA may be selected based at least in part on beam management performed by the narrowband entity 804 and/or the UE entity 806. The PA may provide the signal to a duplexer and feeder before emission via a transmission beam by the lens antenna and/or beamformer.

As indicated above, FIG. 8 is provided as an example. Other examples may differ from what is described with respect to FIG. 8.

Figure 9:
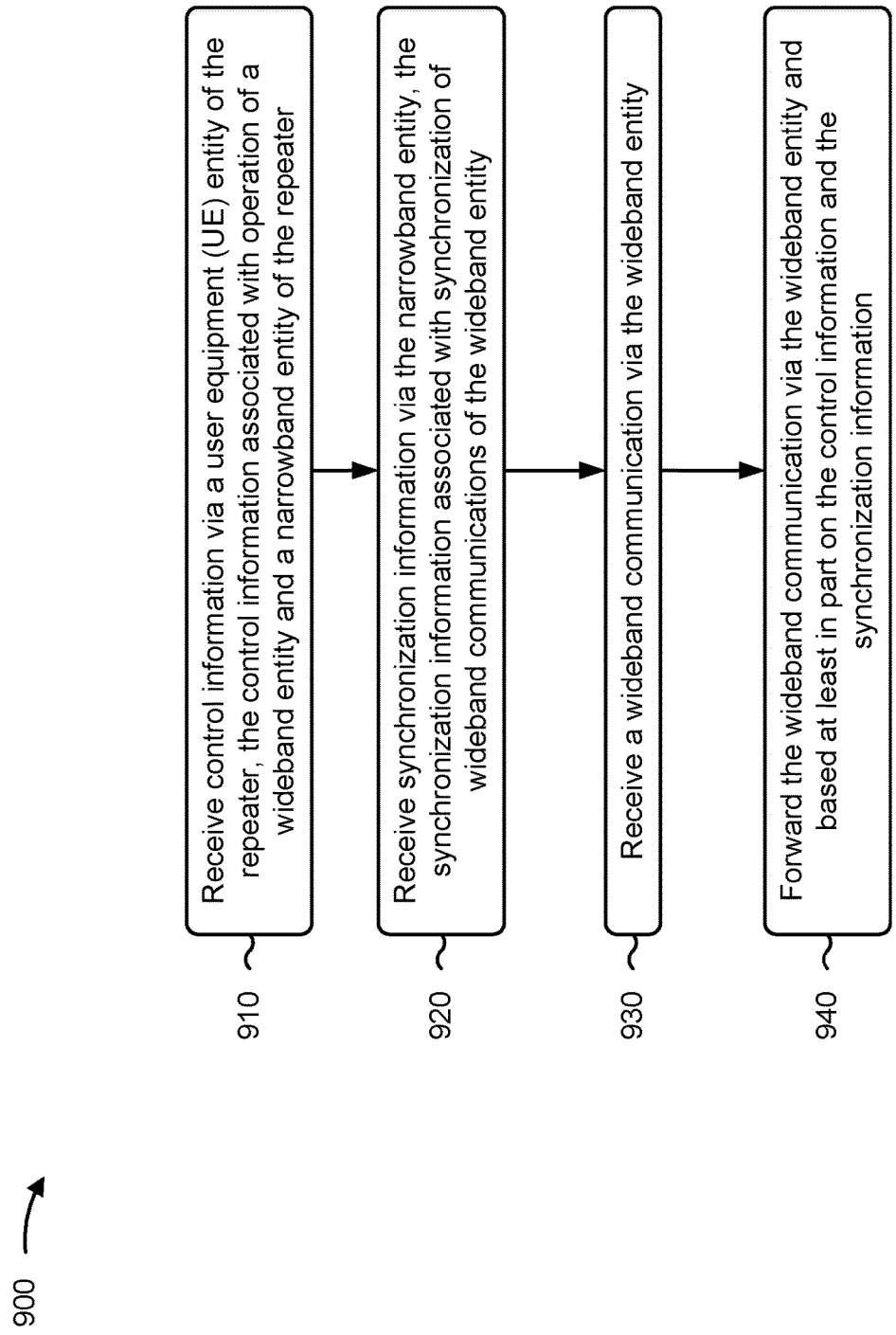
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., a repeater) performs operations associated with repeater A&F operations.

As shown in FIG. 9, in some aspects, process 900 may include receiving control information via a UE entity of the repeater, the control information associated with operation of a wideband entity and a narrowband entity of the repeater (block 910). For example, the network node (e.g., using reception component 1002 and/or communication manager 1006, depicted in FIG. 10) may receive control information via a UE entity of the repeater, the control information associated with operation of a wideband entity and a narrowband entity of the repeater, as described above.

As further shown in FIG. 9, in some aspects, process 900 may include receiving synchronization information via the narrowband entity, the synchronization information associated with synchronization of wideband communications of the wideband entity (block 920). For example, the network node (e.g., using reception component 1002 and/or communication manager 1006, depicted in FIG. 10) may receive synchronization information via the narrowband entity, the synchronization information associated with synchronization of wideband communications of the wideband entity, as described above.

As further shown in FIG. 9, in some aspects, process 900 may include receiving a wideband communication via the wideband entity (block 930). For example, the network node (e.g., using reception component 1002 and/or communication manager 1006, depicted in FIG. 10) may receive a wideband communication via the wideband entity (e.g., based at least in part on the control information and the synchronization information), as described above.

As further shown in FIG. 9, in some aspects, process 900 may include forwarding the wideband communication via the wideband entity and based at least in part on the control information and the synchronization information (block 930). For example, the network node (e.g., using transmission component 1004 and/or communication manager 1006, depicted in FIG. 10) may forward the wideband communications via the wideband entity and based at least in part on the control information and the synchronization information, as described above.

Process 900 may include additional aspects, such as any single aspect or any combination of aspects described below and/or in connection with one or more other processes described elsewhere herein.

In a first aspect, receiving and forwarding the wideband communications comprises one or more of receiving a first communication from a UE and forwarding the first communication to a network node, or receiving a second communication from the network node and forwarding the second communication to the UE.

In a second aspect, receiving and forwarding the wideband communications comprises one or more of receiving a communication via a lens antenna or beamformer, or forwarding the communication via a lens antenna or beamformer.

In a third aspect, receiving and forwarding the wideband communications comprises one or more of receiving the wideband communications via a first beam selected from a first set of beams, each beam of the first set of beams associated with a different RF path, or forwarding the wideband communications via a second beam selected from a second set of beams, each beam of the second set of beams associated with a different RF path.

In a fourth aspect, process 900 includes selecting one or more of a first RF path associated with the first beam, selection of the first RF path comprising using a first RF switch located after a reception amplifier, or a second RF path associated with the second beam, selection of the second RF path comprising using a second RF switch located before a transmission amplifier.

In a fifth aspect, process 900 includes deactivating one or more of reception amplifiers except for the reception amplifier, or transmission amplifiers except for the transmission amplifier.

In a sixth aspect, receiving and forwarding the wideband communications comprises one or more of receiving a communication via a first frequency bandwidth and forwarding the communication via a second frequency bandwidth, or receiving the communication via the first frequency bandwidth and forwarding the communication via the first frequency bandwidth.

In a seventh aspect, a highest frequency of the first frequency bandwidth is less than a lowest frequency of the second frequency bandwidth by an amount that satisfies a threshold, or wherein a highest frequency of the second frequency bandwidth is less than a lowest frequency of the first frequency bandwidth by an amount that satisfies the threshold.

In an eighth aspect, receiving the communication via the first frequency bandwidth and forwarding the communication via the second frequency bandwidth comprises providing signaling of the communication to one or more band pass filters. and providing the signaling of the communication to a transmission amplifier after providing the signaling to the one or more band pass filters and before forwarding the communication.

In a ninth aspect, process 900 includes receiving, at the narrowband entity, one or more reference signals, and performing, at the narrowband entity, beam management associated with the wideband communications.

In a tenth aspect, process 900 includes transmitting, via narrowband signaling, synchronization information to an additional repeater, or performing, via narrowband signaling, beam management with the additional repeater.

In an eleventh aspect, process 900 includes providing the control information from the UE entity to the narrowband entity, and providing, from the narrowband entity, control signaling to the wideband entity.

In a twelfth aspect, the control information comprises one or more of an on or off state for the wideband entity, beaming control for the wideband communications, control for the wideband communications, time domain duplexing control for the wideband communications, gaining control for the wideband communications, a path selector for a radio frequency switch, or coursing synchronization information.

In a thirteenth aspect, receiving the control information via the UE entity comprises receiving the control information via a bandwidth that is lower than a bandwidth of the wideband communications.

In a fourteenth aspect, receiving the control information via the UE entity comprises receiving the control information via a PCell link with a network node, and wherein receiving and forwarding the wideband communications comprises receiving and forwarding the wideband communications via a SCell link with the network or a UE.

In a fifteenth aspect, the UE entity comprises a reduce capability (REDCAP) UE entity.

In a sixteenth aspect, the wideband entity comprises an analog amplify and forward component.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
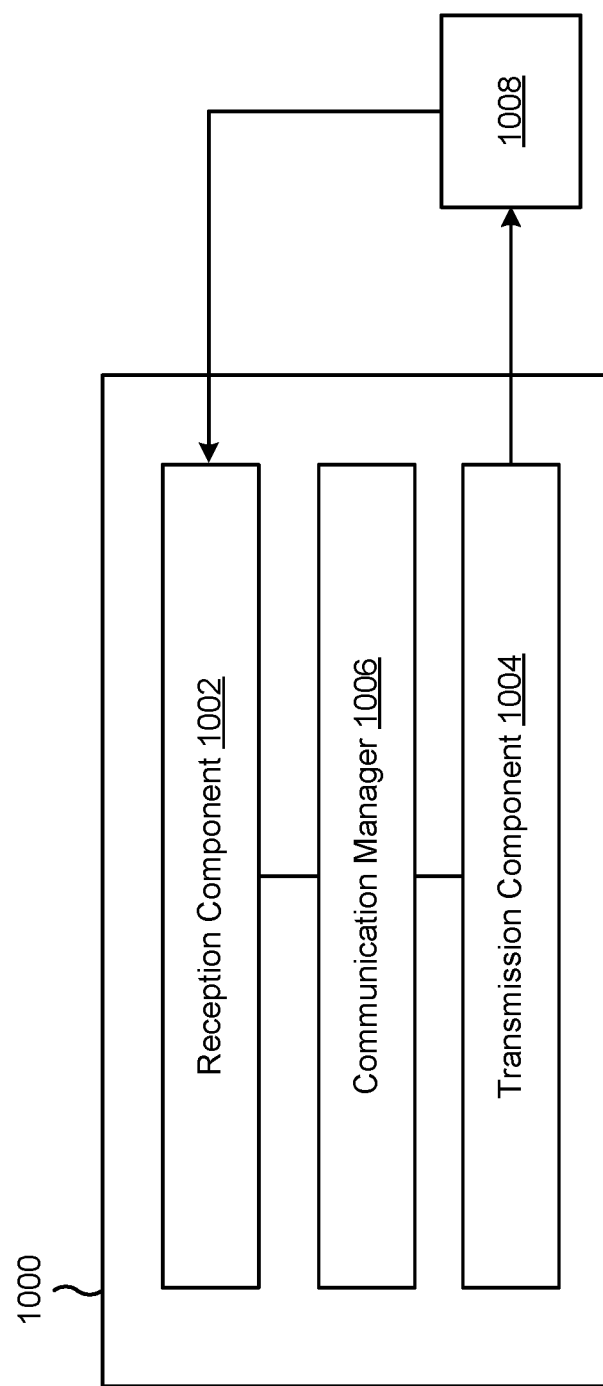
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a repeater, or a repeater may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 7-8. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the repeater described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the repeater described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the repeater described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive control information via a UE entity of the repeater, the control information associated with operation of a wideband entity and a narrowband entity of the repeater. The reception component 1002 may receive synchronization information via the narrowband entity, the synchronization information associated with synchronization of wideband communications of the wideband entity. The reception component 1002 may receive a wideband communication via the wideband entity. The transmission component 1004 may transmit the wideband communication via the wideband entity and based at least in part on the control information and the synchronization information.

The communication manager 1006 may select one or more of a first RF path associated with the first beam, selection of the first RF path comprising using a first RF switch located after a reception amplifier, or a second RF path associated with the second beam, selection of the second RF path comprising using a second RF switch located before a transmission amplifier.

The communication manager 1006 may deactivate one or more of reception amplifiers except for the reception amplifier, or transmission amplifiers except for the transmission amplifier.

The reception component 1002 may receive, at the narrowband entity, one or more reference signals.

The communication manager 1006 may perform, at the narrowband entity, beam management associated with the wideband communications.

The transmission component 1004 may transmit, via narrowband signaling. synchronization information to an additional repeater.

The communication manager 1006 may perform, via narrowband signaling. beam management with the additional repeater.

The communication manager 1006 may provide the control information from the UE entity to the narrowband entity.

The communication manager 1006 may provide, from the narrowband entity, control signaling to the wideband entity.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a repeater. comprising: receiving control information via a user equipment (UE) entity of the repeater, the control information associated with operation of a wideband entity and a narrowband entity of the repeater; receiving synchronization information via the narrowband entity, the synchronization information associated with synchronization of wideband communications of the wideband entity; receiving a wideband communication via the wideband entity; and forwarding the wideband communication via the wideband entity and based at least in part on the control information and the synchronization information.

Aspect 2: The method of Aspect 1, wherein receiving and forwarding the wideband communications comprises one or more of: receiving a first communication from a UE and forwarding the first communication to a network node; or receiving a second communication from the network node and forwarding the second communication to the UE.

Aspect 3: The method of any of Aspects 1-2, wherein receiving and forwarding the wideband communications comprises one or more of: receiving a communication via a lens antenna or beamformer; or forwarding the communication via a lens antenna or beamformer.

Aspect 4: The method of any of Aspects 1-3, wherein receiving and forwarding the wideband communications comprises one or more of: receiving the wideband communications via a first beam selected from a first set of beams, each beam of the first set of beams associated with a different radio frequency (RF) path; or forwarding the wideband communications via a second beam selected from a second set of beams, each beam of the second set of beams associated with a different RF path.

Aspect 5: The method of Aspect 4, further comprising selecting one or more of: a first RF path associated with the first beam, selection of the first RF path comprising using a first RF switch located after a reception amplifier, or a second RF path associated with the second beam, selection of the second RF path comprising using a second RF switch located before a transmission amplifier.

Aspect 6: The method of Aspect 5, further comprising deactivating one or more of: reception amplifiers except for the reception amplifier, or transmission amplifiers except for the transmission amplifier.

Aspect 7: The method of any of Aspects 1-6, wherein receiving and forwarding the wideband communications comprises one or more of: receiving a communication via a first frequency bandwidth and forwarding the communication via a second frequency bandwidth, or receiving the communication via the first frequency bandwidth and forwarding the communication via the first frequency bandwidth.

Aspect 8: The method of Aspect 7, wherein a highest frequency of the first frequency bandwidth is less than a lowest frequency of the second frequency bandwidth by an amount that satisfies a threshold, or wherein a highest frequency of the second frequency bandwidth is less than a lowest frequency of the first frequency bandwidth by an amount that satisfies the threshold.

Aspect 9: The method of Aspect 7, wherein receiving the communication via the first frequency bandwidth and forwarding the communication via the second frequency bandwidth comprises: providing signaling of the communication to one or more band pass filters; and providing the signaling of the communication to a transmission amplifier after providing the signaling to the one or more band pass filters and before forwarding the communication.

Aspect 10: The method of any of Aspects 1-9, further comprising: receiving, at the narrowband entity, one or more reference signals; and performing, at the narrowband entity, beam management associated with the wideband communications.

Aspect 11: The method of any of Aspects 1-10, further comprising: transmitting, via narrowband signaling, synchronization information to an additional repeater, or performing, via narrowband signaling, beam management with the additional repeater.

Aspect 12: The method of any of Aspects 1-11, further comprising: providing the control information from the UE entity to the narrowband entity; and providing, from the narrowband entity, control signaling to the wideband entity.

Aspect 13: The method of any of Aspects 1-12, wherein the control information comprises one or more of: an on or off state for the wideband entity, beam control for the wideband communications, direction control for the wideband communications, time domain duplexing control for the wideband communications, gain control for the wideband communications, a path selector for a radio frequency switch, or course synchronization information.

Aspect 14: The method of any of Aspects 1-13, wherein receiving the control information via the UE entity comprises: receiving the control information via a bandwidth that is lower than a bandwidth of the wideband communications.

Aspect 15: The method of any of Aspects 1-14, wherein receiving the control information via the UE entity comprises receiving the control information via a primary cell (PCell) link with a network node, and wherein receiving and forwarding the wideband communications comprises receiving and forwarding the wideband communications via a secondary cell (SCell) link with the network or a UE.

Aspect 16: The method of any of Aspects 1-15, wherein the UE entity comprises a reduce capability (REDCAP) UE entity.

Aspect 17: The method of any of Aspects 1-16, wherein the wideband entity comprises an analog amplify and forward component.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater for wireless communication, comprising:
a memory; and
one or more processors, coupled to the memory, configured to:
receive control information via a user equipment (UE) entity of the repeater, the control information associated with operation of a wideband entity and a narrowband entity of the repeater;

receive synchronization information via the narrowband entity, the synchronization information associated with synchronization of wideband communications of the wideband entity;
receive a wideband communication via the wideband entity; and
forward the wideband communication via the wideband entity and based at least in part on the control information and the synchronization information.

2. The repeater of claim 1, wherein the one or more processors, to receive and forward the wideband communications, are configured to:
receive a first communication from a UE and forward the first communication to a network node; or
receive a second communication from the network node and forward the second communication to the UE.

3. The repeater of claim 1, wherein the one or more processors, to receive and forwarding the wideband communications, are configured to:
receive a communication via a lens antenna or beamformer; or
forward the communication via a lens antenna or beamformer.

4. The repeater of claim 1, wherein the one or more processors, to receive and forwarding the wideband communications, are configured to:
receive the wideband communications via a first beam selected from a first set of beams, each beam of the first set of beams associated with a different radio frequency (RF) path; or
forward the wideband communications via a second beam selected from a second set of beams, each beam of the second set of beams associated with a different RF path.

5. The repeater of claim 4, wherein the one or more processors are further configured to select one or more of:
a first RF path associated with the first beam, selection of the first RF path comprising using a first RF switch located after a reception amplifier, or
a second RF path associated with the second beam, selection of the second RF path comprising using a second RF switch located before a transmission amplifier.

6. The repeater of claim 5, wherein the one or more processors are further configured to deactivate one or more of:
reception amplifiers except for the reception amplifier, or
transmission amplifiers except for the transmission amplifier.

7. The repeater of claim 1, wherein the one or more processors, to receive and forwarding the wideband communications, are configured to:
receive a communication via a first frequency bandwidth and forwarding the communication via a second frequency bandwidth, or
receive the communication via the first frequency bandwidth and forwarding the communication via the first frequency bandwidth.

8. The repeater of claim 7, wherein a highest frequency of the first frequency bandwidth is less than a lowest frequency of the second frequency bandwidth by an amount that satisfies a threshold, or
wherein a highest frequency of the second frequency bandwidth is less than a lowest frequency of the first frequency bandwidth by an amount that satisfies the threshold.

9. The repeater of claim 7, wherein the one or more processors, to receive the communication via the first frequency bandwidth and forwarding the communication via the second frequency bandwidth, are configured to:
provide signaling of the communication to one or more band pass filters; and
provide the signaling of the communication to a transmission amplifier after providing the signaling to the one or more band pass filters and before forwarding the communication.

10. The repeater of claim 1, wherein the one or more processors are further configured to:
receive, at the narrowband entity, one or more reference signals; and
perform, at the narrowband entity, beam management associated with the wideband communications.

11. The repeater of claim 1, wherein the one or more processors are further configured to:
transmit, via narrowband signaling, synchronization information to an additional repeater, or
perform, via narrowband signaling, beam management with the additional repeater.

12. The repeater of claim 1, wherein the one or more processors are further configured to:
provide the control information from the UE entity to the narrowband entity; and
provide, from the narrowband entity, control signaling to the wideband entity.

13. The repeater of claim 1, wherein the control information comprises one or more of:
an on or off state for the wideband entity,
beam control for the wideband communications,
direction control for the wideband communications,
time domain duplexing control for the wideband communications,
gain control for the wideband communications,
a path selector for a radio frequency switch, or
course synchronization information.

14. The repeater of claim 1, wherein the one or more processors, to receive the control information via the UE entity, are configured to:
receive the control information via a bandwidth that is lower than a bandwidth of the wideband communications.

15. The repeater of claim 1, wherein the one or more processors, to receive the control information via the UE entity, are configured to receive the control information via a primary cell (PCell) link with a network node, and
wherein the one or more processors, to receive and forwarding the wideband communications, are configured to receive and forwarding the wideband communications via a secondary cell (SCell) link with the network or a UE.

16. The repeater of claim 1, wherein the UE entity comprises a reduce capability (REDCAP) UE entity.

17. The repeater of claim 1, wherein the wideband entity comprises an analog amplify and forward component.

18. A method of wireless communication performed by a repeater, comprising:
receiving control information via a user equipment (UE) entity of the repeater, the control information associated with operation of a wideband entity and a narrowband entity of the repeater;
receiving synchronization information via the narrowband entity, the synchronization information associated with synchronization of wideband communications of the wideband entity; and receiving and forwarding the wideband communications via the wideband entity and based at least in part on the control information and the synchronization information.

19. The method of claim 18, wherein receiving and forwarding the wideband communications comprises one or more of:
   receiving a first communication from a UE and forwarding the first communication to a network node; or
   receiving a second communication from the network node and forwarding the second communication to the UE.

20. The method of claim 18, wherein receiving and forwarding the wideband communications comprises one or more of:
   receiving a communication via a lens antenna or beamformer; or
   forwarding the communication via a lens antenna or beamformer.

21. The method of claim 18, wherein receiving and forwarding the wideband communications comprises one or more of:
   receiving the wideband communications via a first beam selected from a first set of beams, each beam of the first set of beams associated with a different radio frequency (RF) path; or
   forwarding the wideband communications via a second beam selected from a second set of beams, each beam of the second set of beams associated with a different RF path.

22. The method of claim 21, further comprising selecting one or more of:
   a first RF path associated with the first beam, selection of the first RF path comprising using a first RF switch located after a reception amplifier, or
   a second RF path associated with the second beam, selection of the second RF path comprising using a second RF switch located before a transmission amplifier.

23. The method of claim 22, further comprising deactivating one or more of:
   reception amplifiers except for the reception amplifier, or
   transmission amplifiers except for the transmission amplifier.

24. The method of claim 18, wherein receiving and forwarding the wideband communications comprises one or more of:
   receiving a communication via a first frequency bandwidth and forwarding the communication via a second frequency bandwidth, or
   receiving the communication via the first frequency bandwidth and forwarding the communication via the first frequency bandwidth.

25. The method of claim 18, further comprising:
   receiving, at the narrowband entity, one or more reference signals; and
   performing, at the narrowband entity, beam management associated with the wideband communications.

26. The method of claim 18, further comprising:
   providing the control information from the UE entity to the narrowband entity; and
   providing, from the narrowband entity, control signaling to the wideband entity.

27. The method of claim 18, wherein the control information comprises one or more of:
   an on or off state for the wideband entity,
   beam control for the wideband communications,
   direction control for the wideband communications,
   time domain duplexing control for the wideband communications,
   gain control for the wideband communications,
   a path selector for a radio frequency switch, or
   course synchronization information.

28. The method of claim 18, wherein receiving the control information via the UE entity comprises receiving the control information via a primary cell (PCell) link with a network node, and
   wherein receiving and forwarding the wideband communications comprises receiving and forwarding the wideband communications via a secondary cell (SCell) link with the network or a UE.

29. A non-transitory computer-readable medium storing a set of instructions for wireless communication, the set of instructions comprising:
   one or more instructions that, when executed by one or more processors of a repeater, cause the repeater to:
      receive control information via a user equipment (UE) entity of the repeater, the control information associated with operation of a wideband entity and a narrowband entity of the repeater;
      receive synchronization information via the narrowband entity, the synchronization information associated with synchronization of wideband communications of the wideband entity; and
      receive and forwarding the wideband communications via the wideband entity and based at least in part on the control information and the synchronization information.

30. An apparatus for wireless communication, comprising:
   means for receiving control information via a user equipment (UE) entity of the apparatus, the control information associated with operation of a wideband entity and a narrowband entity of the apparatus;
   means for receiving synchronization information via the narrowband entity, the synchronization information associated with synchronization of wideband communications of the wideband entity; and
   means for receiving and forwarding the wideband communications via the wideband entity and based at least in part on the control information and the synchronization information.

* * * * *